(12) United States Patent
Sritharan et al.

(10) Patent No.: US 8,881,485 B2
(45) Date of Patent: Nov. 11, 2014

(54) WIND TURBINE TOWER SYSTEM

(71) Applicant: Iowa State University Research Foundation, Inc., Ames, IA (US)

(72) Inventors: Sivalingam Sritharan, Ames, IA (US); Thomas J. Lewin, Overland Park, KS (US); Grant M. Schmitz, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 14/276,633

(22) Filed: May 13, 2014

(65) Prior Publication Data

US 2014/0245671 A1    Sep. 4, 2014

Related U.S. Application Data

(63) Continuation-in-part of application No. 13/478,497, filed on May 23, 2012.

(60) Provisional application No. 61/488,939, filed on May 23, 2011.

(51) Int. Cl.
| | |
|---|---|
| *E04H 12/12* | (2006.01) |
| *F03D 11/04* | (2006.01) |
| *E04H 12/16* | (2006.01) |
| *E04H 12/34* | (2006.01) |

(52) U.S. Cl.
CPC ............ *F03D 11/04* (2013.01); *E04H 12/16* (2013.01); *E04H 12/34* (2013.01); *E04H 12/12* (2013.01)
USPC .................................... 52/651.07; 52/651.01

(58) Field of Classification Search
CPC ............................ E04H 12/12; Y02E 10/728
USPC .......................................... 52/651.01, 651.07
See application file for complete search history.

(56) References Cited

U.S. PATENT DOCUMENTS

| | | | |
|---|---|---|---|
| 6,467,233 B1 | 10/2002 | Maliszewski et al. | |
| 7,739,843 B2 | 6/2010 | Cortina-Cordero | |
| 7,765,766 B2 | 8/2010 | Gomez et al. | |
| 7,770,343 B2 | 8/2010 | Montaner Fraguet et al. | |
| 8,181,748 B2 * | 5/2012 | Christensen | 187/245 |
| 8,458,970 B2 * | 6/2013 | Zavitz et al. | 52/223.5 |
| 8,474,212 B2 * | 7/2013 | Husemann et al. | 52/651.07 |

(Continued)

FOREIGN PATENT DOCUMENTS

WO    2006133122    12/2006

OTHER PUBLICATIONS

Lohaus, L. et al., "High-cycle Fatigue of "Ultra-High Performance concrete" and "Grouted Joints" for Offshore Wind Energy Turbines", Proceedings of the Euromech Colloquim. Dec. 31, 2007.

*Primary Examiner* — Andrew J Triggs
(74) *Attorney, Agent, or Firm* — McKee, Voorhees & Sease

(57) ABSTRACT

A wind turbine tower system includes a wind turbine tower with a height of at least 100 meters, said wind turbine tower. The wind turbine tower includes a plurality of hexagonal-shaped or other shapes of vertical columns comprised of a concrete composition and a plurality of panels, each of the plurality of panels extending between adjacent vertical columns. The plurality of vertical columns and the plurality of panels are arranged to provide a hexagonal cross-section for the wind turbine tower.

20 Claims, 32 Drawing Sheets

(56) References Cited

U.S. PATENT DOCUMENTS

| | | | |
|---|---|---|---|
| 8,522,502 B2* | 9/2013 | Huesemann | 52/651.01 |
| 2002/0012582 A1* | 1/2002 | Kirkegaard et al. | 415/4.3 |
| 2004/0094965 A1* | 5/2004 | Kirkegaard et al. | 290/55 |
| 2006/0213145 A1 | 9/2006 | Haller | |
| 2006/0273597 A1 | 12/2006 | Rashidi | |
| 2006/0277843 A1* | 12/2006 | Livingston et al. | 52/110 |
| 2007/0095008 A1* | 5/2007 | Arsene | 52/745.04 |
| 2009/0016897 A1 | 1/2009 | Olgaard | |
| 2010/0084867 A1* | 4/2010 | Sato | 290/52 |
| 2010/0226785 A1* | 9/2010 | Livingston et al. | 416/244 R |
| 2010/0242406 A1* | 9/2010 | Oliphant et al. | 52/846 |
| 2011/0133475 A1* | 6/2011 | Zheng et al. | 290/55 |
| 2011/0302879 A1* | 12/2011 | Baker | 52/745.17 |
| 2011/0304142 A1* | 12/2011 | Baker | 290/44 |
| 2012/0137621 A1* | 6/2012 | Husemann et al. | 52/651.01 |
| 2013/0067853 A1* | 3/2013 | Baker | 52/745.17 |

\* cited by examiner

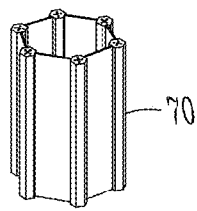
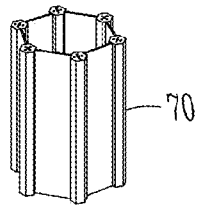
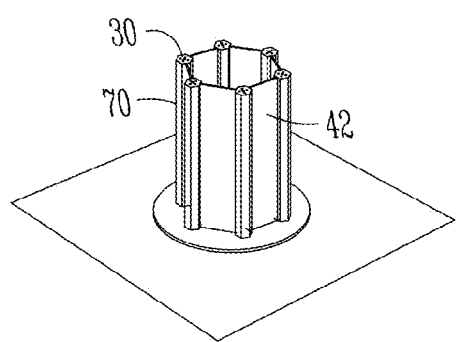
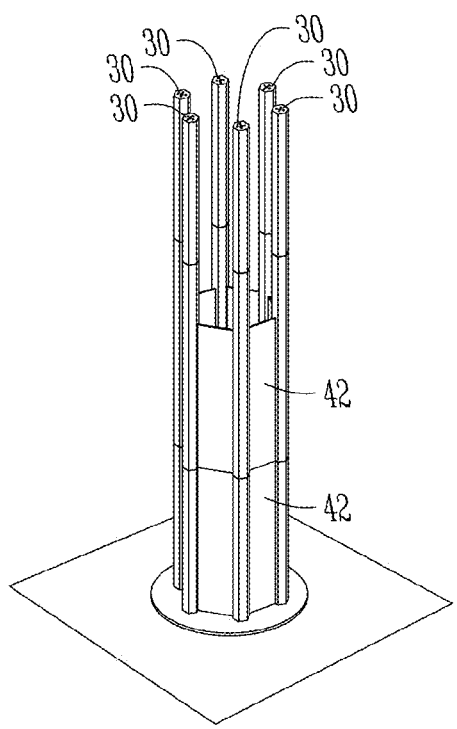
Fig. 12A                    Fig. 12B

WIND TURBINE TOWER SYSTEM

CROSS-REFERENCE TO RELATED APPLICATIONS

This application is a Continuation-In-Part application of Ser. No. 13/478,497 filed May 23, 2012, which claims priority under 35 U.S.C. §119 to provisional application Ser. No. 61/488,939 filed May 23, 2011, herein incorporated by reference in its entirety.

FIELD OF THE INVENTION

The present invention relates to wind turbine towers systems and more particularly, but not exclusively, to the structure of the towers and the use of ultra-high performance concrete (UHPC) and High Performance/Strength Concrete (i.e., HPC/HSC) in the towers.

BACKGROUND

As wind turbines are continued to be placed at higher elevations, the need for taller wind turbine towers becomes necessary. Taller towers expose turbines to higher velocities and less turbulent wind, both of which likely to increase operating time resulting in increased power production. However, there are multiple challenges associated with extending the currently used 262 foot (80 meter) tall tubular steel towers to greater elevations.

For example, there are significant transportation costs associated with steel tubular towers. These include not merely the cost of transportation which can be significant as often materials must travel long distances, but also practical limitations on steel tower size such as those associated with highway clearance issues. Another issue with steel is its design is governed by fatigue and thus its critical dimensions are controlled by design life. Increasing the design life of steel towers will also increase the tower cost.

What is needed are alternative tower designs and/or construction materials which overcome these problems.

SUMMARY OF THE INVENTION

Therefore, it is a primary object, feature, or advantage of the present invention to provide leap forward improvements over the state of the art.

It is a further object, feature, or advantage of the present invention to provide for wind turbine tower designs which use high and ultra-high strength cementitious materials such as HPC, HSC and UHPC.

It is a further object, feature, or advantage of the present invention to provide a wind turbine tower suitable for use to provide hub heights of 80 meters or more.

A still further object, feature, or advantage of the present invention is to provide wind turbine towers which provide a cost-effective alternative to steel towers which provide numerous challenges especially for taller towers.

Another object, feature, or advantage of the present invention is to provide a tower which is modular such that multiple pieces compose any given cross section and/or vertical segment.

Yet another object, feature, or advantage of the present invention is to enable wind turbines to be supported cost effectively at hub heights of 80 meters and above while resisting the loads from wind turbine, gravity, wind forces, extreme loads such as due to earthquake, or combinations thereof.

A still further object, feature, or advantage of the present invention is to provide a reliable and cost effective means to elevate a wind turbine to a height sufficient to efficiently produce energy from the wind.

Another object, feature, or advantage of the present invention is to provide a wind turbine tower with increased longevity relative to currently used steel towers with 20-25 year lifespan.

Yet another object, feature, or advantage of the present invention is to provide a wind turbine tower that may be disassembled and reused at a different location.

A further object, feature, or advantage of the present invention is to provide a wind turbine tower which uses less material than a regular strength concrete tower which generally requires much larger base dimension than steel tower.

A still further object, feature, or advantage of the present invention is to provide a wind turbine tower with the potential for reduced construction costs.

A still further object, feature, or advantage of the present invention is to provide a wind turbine tower with reduced transportation and site development costs relative to normal concrete wind turbine towers.

Yet another object, feature, or advantage of the present invention is to provide suitable connections between the precast components of the tower that allow it to behave as one composite system when loaded.

Another object, feature, or advantage of the present invention is to use modular components that can be either prefabricated and transported using standard trucks, or cast on site.

A further object, feature, or advantage of the present invention is to increase the design life for wind turbine towers to 40-50 years (or more) instead of the 20-25 years as used currently.

A still further object, feature, or advantage of the present invention is to use readily available high performance materials to minimize weight and transportation costs.

Another object, feature, or advantage of the present invention is to provide a hybrid tower which may include concrete materials as well as steel.

These and or other objects, features, or advantages of the present invention will become apparent from the specification and claims that follow. No single aspect or embodiment of the present invention need exhibit each and every one of these objects, features, and advantages.

According to one aspect of the present invention, a wind turbine tower system is provided. The wind turbine tower system includes a wind turbine tower with a height of at least 80 meters, said wind turbine tower being comprised of ultra-high performance concrete and HPC/HSC elements. The system further includes a wind turbine mounted on the wind turbine tower.

According to another aspect of the present invention, a wind turbine tower system is provided. The wind turbine tower system includes a vertically extending structure formed of a plurality of modular components, wherein each of said plurality of modular components being connected together and a wind turbine mounted on the wind turbine tower. The modular components may include a plurality of columns with varying sections and a plurality of braces between adjacent columns with the columns comprising HPC, HSC or ultra-high performance concrete. The braces may be made from steel, normal concrete, HPC, HSC or ultra-high performance concrete as structural elements or panels with or without prestressing.

According to another aspect, a wind turbine tower system is provided. The system includes a wind turbine tower with a height of at least 100 meters. The wind turbine tower includes a plurality of vertical columns comprised of a concrete composition and a plurality of panels, each of the plurality of panels extending between adjacent hexagonal-shaped vertical columns. The vertical columns may be, for example, circular, or of hexagonal shape to improve constructability. The plurality of vertical columns and the plurality of panels are arranged to provide a hexagonal cross-section for the wind turbine tower. A wind turbine is mounted on the wind turbine tower. Connections between the panels and the hexagonal-shaped vertical columns may be bolted connections, ultra high performance concrete (UHPC) wet connections, or post-tensioned connections. The columns and panels may be formed of ultra high performance concrete (UHPC), High Performance Concrete (HPC) or high strength concrete (HSC).

According to another aspect, a wind turbine tower system includes a wind turbine tower with a height of at least 100 meters, said wind turbine tower includes a plurality of vertical columns comprised of a concrete composition, a plurality of panels, each of the plurality of panels extending between adjacent vertical columns, wherein the plurality of vertical columns and the plurality of panels are arranged to provide a hexagonal cross-section for the wind turbine tower, and a wind turbine mounted on the wind turbine tower.

BRIEF DESCRIPTION OF THE DRAWINGS

FIG. 12A illustrates a cell assembly.

FIG. 12B illustrates a column and panel assembly.

DETAILED DESCRIPTION

Figure 1:
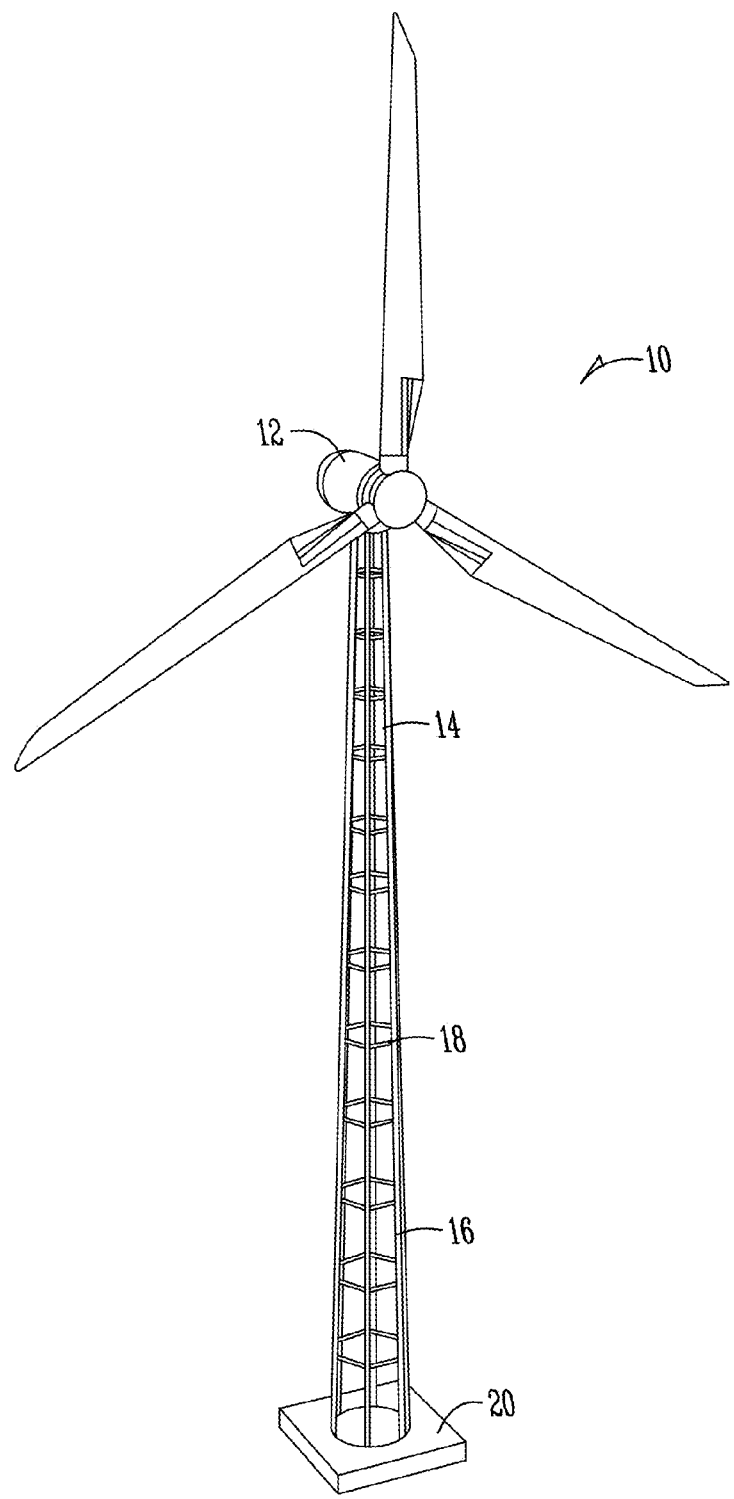
FIG. 1 illustrates one embodiment of a HEXCRETE tower, HEXCRETE is a name provided for a concrete tower with a hexagonal cross-section.

The present invention provides for improved wind turbine towers using members made form UHPC, HPC, HSC or similar high strength cementitious material. UHPC is described in various references including WO 95/01316, herein incorporated by reference in its entirety. The present invention provides various types of UHPC towers. These include UHPC shell towers and UHPC lattice towers and a tower which has both a hexagonal cross-section and includes columns which each have circular or hexagonal cross-sections as described herein.

A material is often classified as an Ultra-High Performance Concrete (UHPC), when it meets the following conditions: compressive stress greater than 21.7 ksi (150 MPa), internal fiber reinforcement to ensure non-brittle behavior, and high binder content with special aggregates. Each of these properties provides an advantage over both normal and high strength concrete. Although a material can be defined as UHPC at lower compressive strengths, it can easily reach compressive limits as high as 32 ksi (220 Mpa). At this level, UHPC becomes competitive with steel in terms of weight/strength ratio making it much more competitive at a high cost.

A material may be characterized as high strength concrete (HSC) when it has a compressive strength greater than about 5.8 ksi (40 Mpa).

A material may be characterized as high performance concrete (HPC) when it conforms to a set of standards above those of the most common applications as would be recognized by one skilled in the art. This definition is consistent with the definition provided by the American Concrete Institute (ACI). Baseline 322 ft (98.2 m) tall concrete and steel designs have been developed so that any UHPC tower design can then be compared directly to them. To facilitate this comparison, both UHPC tower embodiments have been designed for the same wind turbine, the ACCIONA Windpower AW109/3000, as the concrete/steel alternatives. Additionally, they have been designed for the same surface roughness (class D) and wind speed load cases (EWM50 and EOG50). Of course, the present invention contemplates variations in the designs as may be appropriate for a particular height, a particular wind turbine, surface roughness, wind speed load, or other parameters.

UHPC Shell Tower

The UHPC Shell tower is an extension of the 322 ft. (98.2 m) pre-stressed concrete tower. It does not represent a radical new design, but rather seeks to refine current designs and construction methods using an innovative material. The UHPC Shell concept was designed as a bonded, post-tensioned structure although unbonded (internal or external) option is equally applicable.

Design of the UHPC shell tower took into account loading, service-level moment capacity, ultimate moment capacity, service-level shear preventing any cracking, ultimate shear capacity, ultimate torsional moment capacity, torsion and shear interaction, fatigue, and dynamic properties.

The design of the UHPC shell tower identified various advantages relative to concrete and steel towers. The results for the UHPC Shell Tower yielded a design that uses only 31.9% of the material used in a regular strength concrete design. While this represents a more efficient use of resources, it also implies drastically reduced transportation and construction costs. The UHPC Shell tower's weight is very close to that of a steel tower: 866 kips (3850 kN) vs. 739 kips (3290 kN), respectively.

Fatigue is never the governing limit state for the design of the UHPC shell. The UHPC Shell tower's fatigue life is much greater than that of the wind turbine itself, and is controlled by the fatigue of the steel tendons. This long fatigue life would allow the tower to outlast the typical turbine 20-25 year design life, implying the tower could be used with multiple turbines over its life cycle.

Shear and torsion interaction governs the upper portion of the tower design. This is due to the material's excellent compressive strength, which allows for slender sections with high flexural resistance. However, as shear resistance is related to the square root of compressive strength, it was not unexpected that the shear becomes critical. This is not observed in the concrete tower, as larger wall thicknesses are necessary for moment resistance.

The natural frequency of the UHPC shell tower, 0.372 Hz obtained for this particular case, was well within the working frequency range for a 3 MW turbine.

The UHPC Shell deflection was somewhere between the 322 ft. (98.2 m) steel and concrete tower deflections. The UHPC Shell tower design may be appropriately refined for applications requiring small deflections. For example, if the turbine manufacturer required a smaller deflection for the tower, this could be achieved by increasing its base diameter, the volume of UHPC, prestressing steel or combination thereof.

UHPC Lattice Tower

The present invention also provides for using UHPC in lattice towers. The lattice tower provides an alternative to the UHPC shell tower which allows for efficient use of UHPC in combination with HPC/HSC while limiting lateral tower deflection and improving its constructability. While the UHPC Shell design represents a more direct conversion of current steel and concrete designs, the Lattice Tower is a significant departure from standard practice. The lattice tower allows for potential savings in materials, transportation, and erection costs.

The general concept of the Lattice Tower is to concentrate the UHPC/HPC/HSC into six columns. These columns utilize unbonded post-tensioning, and are tied together intermittently using bracing. With sufficient bracing, the columns will act compositely, and resist lateral loads as a whole. Depending on the direction of loading, half of the columns will generally be subjected only to tension, while the others experience compression. As long as these members do not act independently of each other, they can remain relatively slender. A pictorial representation of the Lattice Tower with cross braces is shown in FIG. 1.

Figure 2:
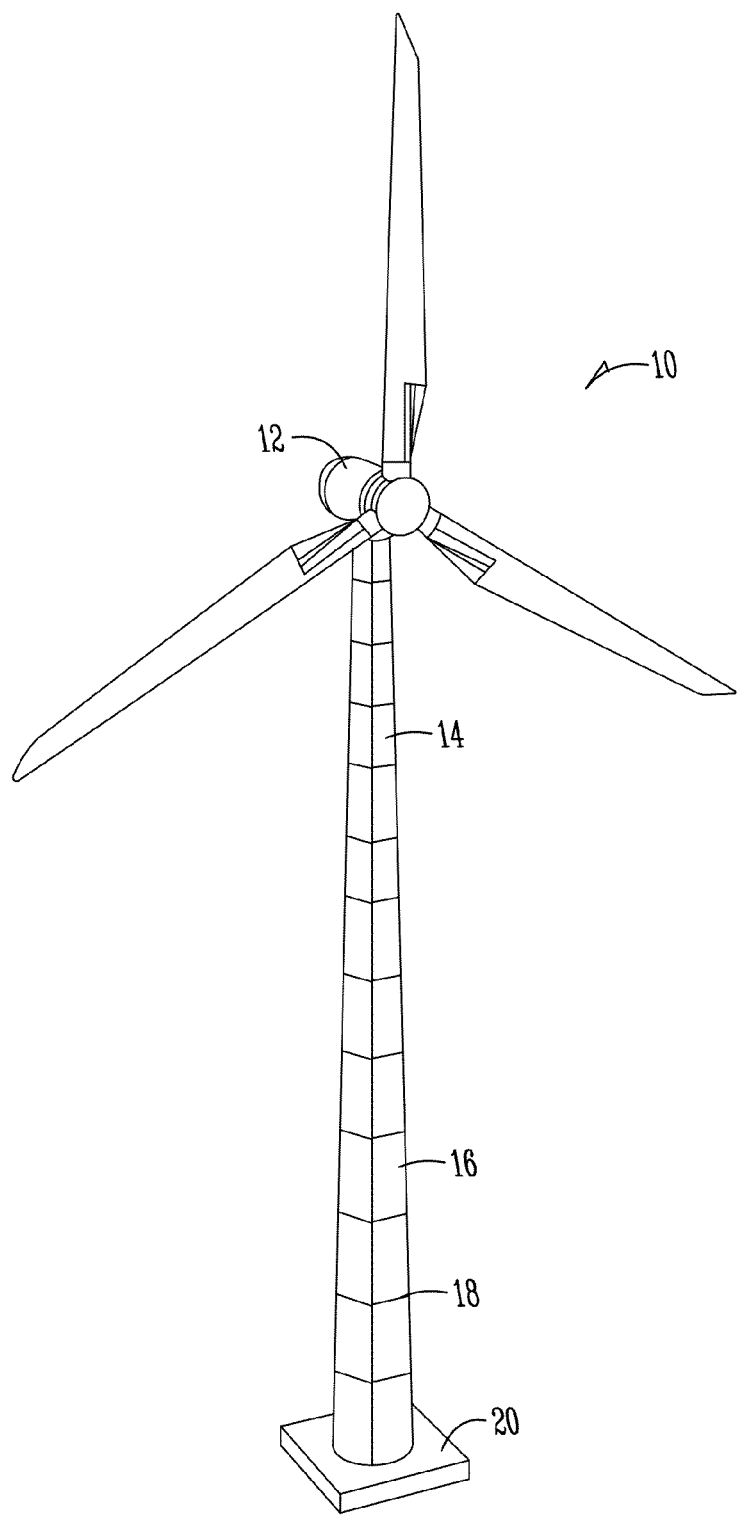
FIG. 2 illustrates the embodiment of the UHPC tower of FIG. 1 with panels present.

In FIG. 1, a wind turbine tower system 10 is shown which includes a wind turbine 12 supported on a wind turbine tower 14. The wind turbine tower 14 includes a plurality of columns 16 extending from a base 20. The plurality of columns 16 are braced together with bracing members 18. Although FIG. 1 depicts the tower with only horizontal bracing members, additional bracing elements will be necessary. Multiple options exist for sufficiently bracing the columns. For example, an open-air concept would combine the horizontal bracing members shown in FIG. 1 with diagonal cross bracing. The horizontal and cross bracing could be formed from concrete, steel, or even UHPC members. For aesthetic reasons, the tower could then be wrapped in a structural fabric, giving it the appearance of typical wind turbine towers seen today. Alternatively, concrete or thin UHPC/HPC or HSC panels could span between the columns, connected intermittently through the use of pinned connections. FIG. 2 is a pictorial representation of the wind turbine tower where panels 22 are present.

Design of the UHPC lattice tower took into account loading, service-level moment capacity, ultimate moment capacity, service-level torsion and shear cracking, fatigue of the columns, and dynamic properties.

Figure 3:
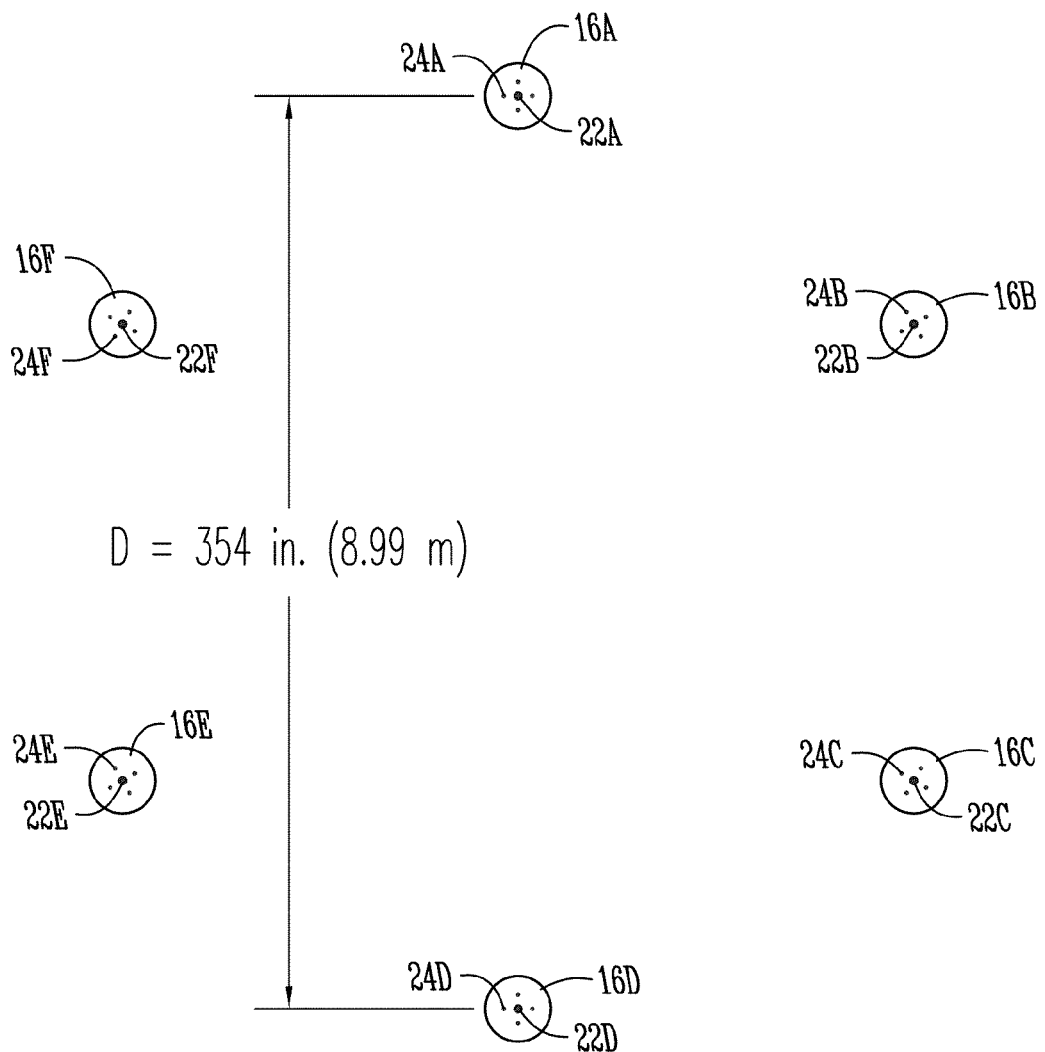
FIG. 3 through FIG. 6 illustrate the cross section of the UHPC tower of FIG. 1 with circular columns.
Figure 4:
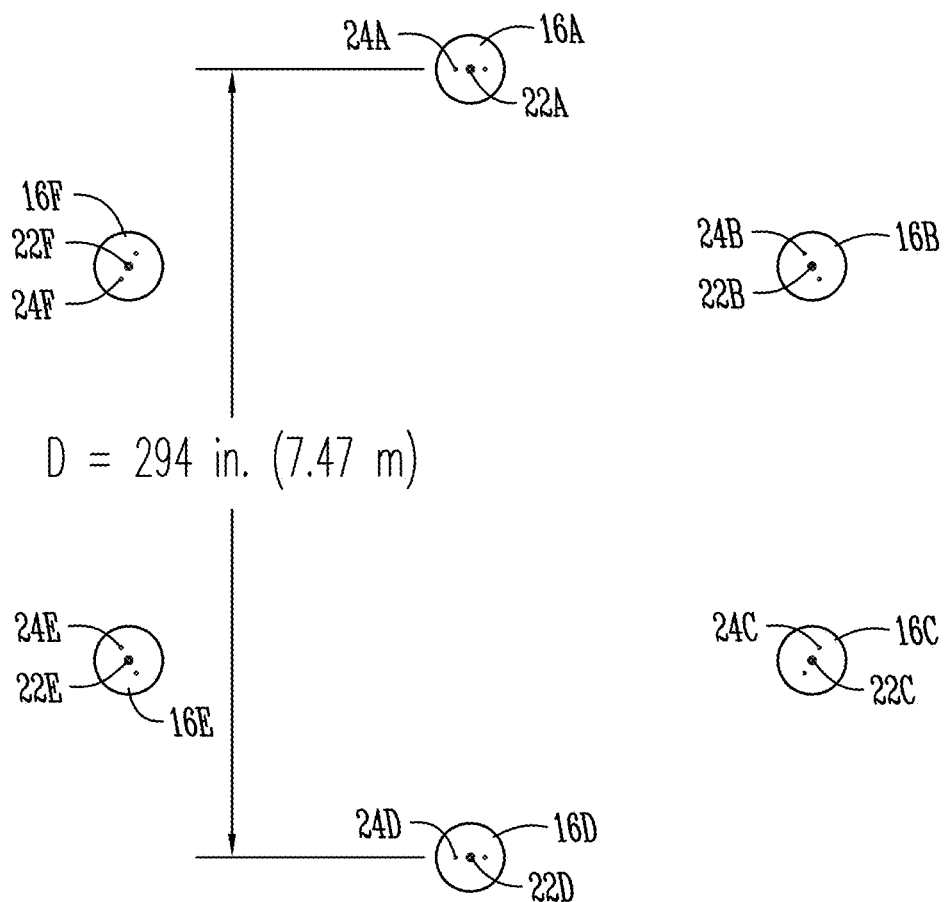
Figure 5:
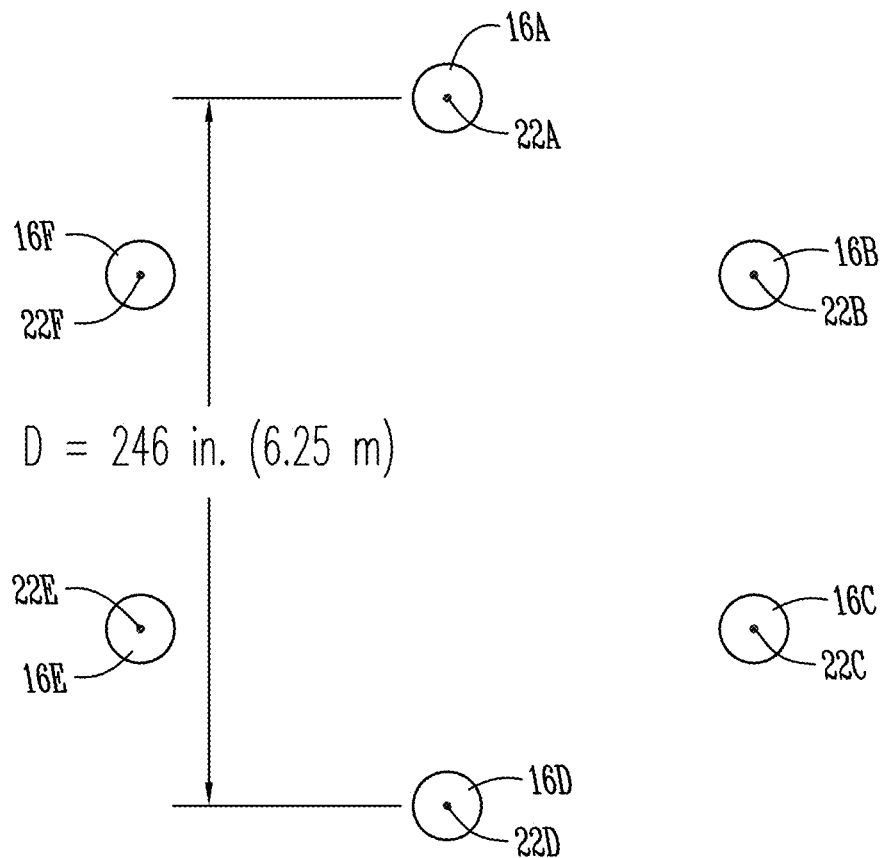
Figure 6:
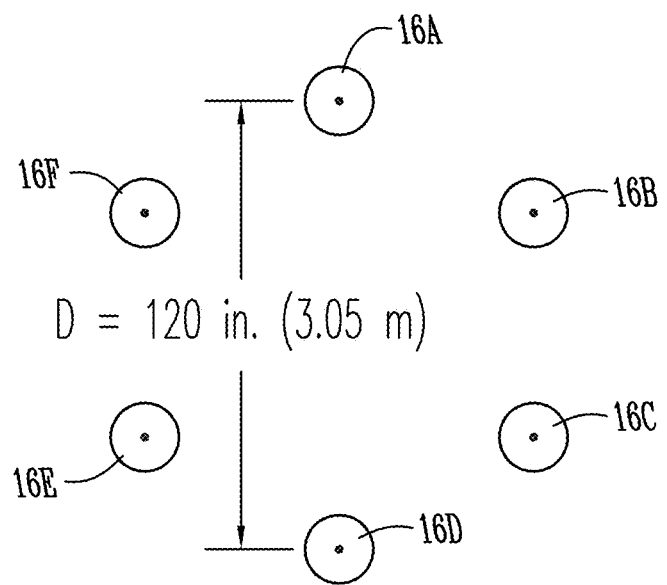
Figure 7:
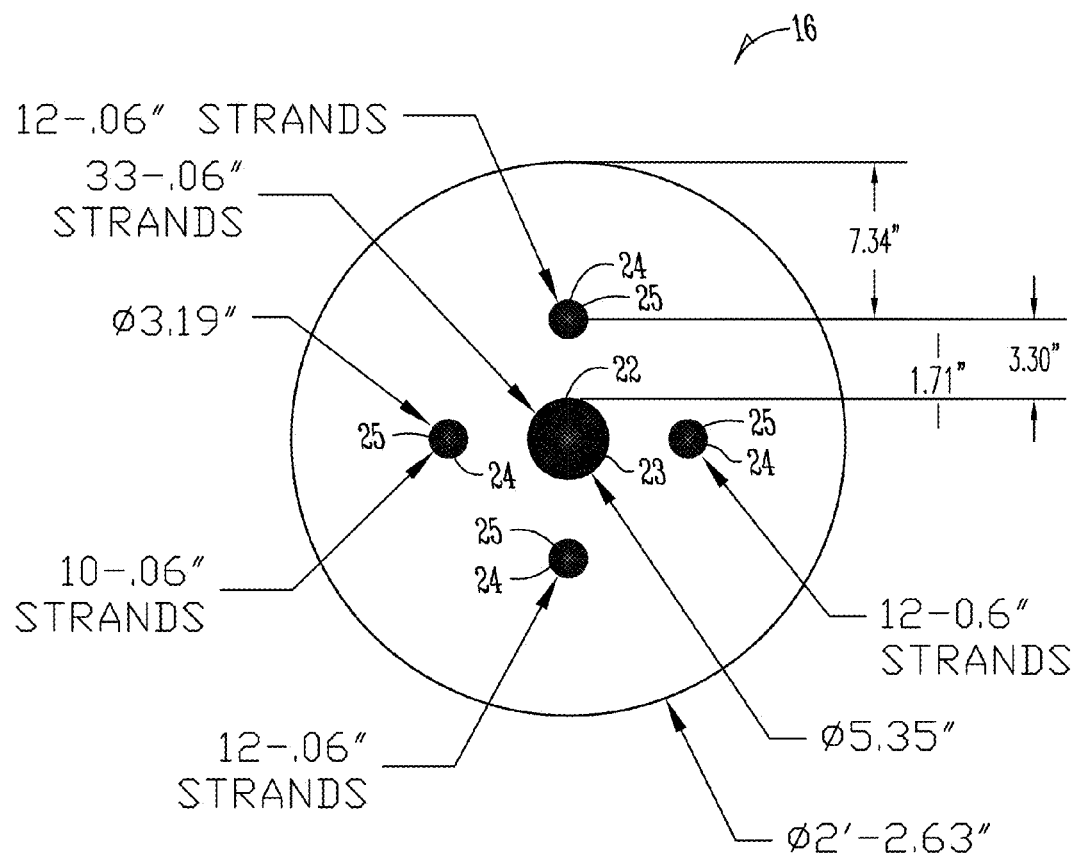
FIG. 7 is a detailed drawing illustrating a circular column of the HEXCRETE tower of FIG. 1.

The cross sections of the tower are shown in FIG. 3 through FIG. 6. FIG. 3 illustrates the cross section of the UHPC lattice tower at the base with circular columns 16A-16F. There are preferably embedded ducts through each column. Post-tensioning tendons 22A-22F, 24A-24F are shown running through the ducts. FIG. 4 illustrates the cross section of the UHPC lattice tower at 110 feet (33.5 m) after two post-tensioning tendon termination. Note that there are fewer post-tensioning tendons shown. FIG. 5 illustrates the cross section of the UHPC lattice tower at 220 feet (67.1 m) after two more post-tensioning tendon termination. FIG. 6 illustrates the cross section of the UHPC lattice tower at the tower top. In order to take advantage of UHPC's high compressive strength, each column was designed with unbonded post-tensioning tendons running through embedded ducts along the entire tower length. A portion of these tendons are terminated at 110 ft. (33.5 m) and 220 ft. (67 m) in order to increase the economy of the tower. A detailed drawing of an individual column is shown in FIG. 7. Note that in FIG. 7, a cross-section of a column 16 is shown with the ducts 23, 25 and corresponding post-tensioning tendons 22, 24. The use of unbonded reinforcement was chosen for the UHPC Lattice tower in order to allow the tower to be disassembled, moved, and reassembled at another location were the environmental conditions, i.e., wind speed, surrounding the tower to change over its design life. The UHPC Lattice tower is more suited to this concept than the concrete and UHPC Shell towers due to its small member sizes. Another advantage of unbonded post-tensioning is the elimination of concentrated steel stresses. Since the steel stress is distributed along the entire tower length, it is expected that even in an ultimate load condition, the post-tensioning steel will not yield. Since it remains elastic, the post-tensioning steel will then restore the tower to its original position when the ultimate load or extreme load such that due to earthquake is removed.

The UHPC Lattice tower may be compared to the UHPC Shell, concrete, and steel designs. An interesting aspect of the UHPC Lattice tower is the increased wind load on the tower, as compared to the UHPC Shell Design. While the Lattice Tower has a truss-like layout, its overall width is larger than the UHPC Shell Tower. Additionally, the UHPC Shell tower enjoys a lower force coefficient.

Without considering the volume of material required for bracing, the Lattice tower uses less UHPC than the UHPC Shell. It is important to note however that the Lattice Tower uses bracing, which will add increased cost and labor to the design and construction. The choice of bracing material, as well as connections could significantly affect the overall price of the UHPC Lattice Tower.

As with the UHPC Shell Tower, fatigue is never a governing limit state for design. This implies the tower could be used with multiple turbines over the course of its design. Additionally, due to its use of unbonded post-tensioning, it could be dismantled and reassembled at another site as previously mentioned. Long fatigue life makes both of these options a possibility.

The 328 ft (100 m) Lattice Tower design has an estimated natural frequency of 0.495 Hz, within the working range of 0.242 Hz to 0.594 Hz for a 3.0 MW turbine. This indicates that the turbine top loads, and more specifically the assumed dynamic amplification, are valid for the structure.

Deflection of the UHPC Lattice Tower is significantly lower than the UHPC Shell tower. This is due to the increased base diameter and therefore the increased lateral stiffness of the UHPC Lattice tower, as compared to the UHPC Shell tower.

Tower Design Options for Lattice Tower

Three towers were developed using different combinations of high strength materials. The tower dimensions and properties are presented for each case, along with their own unique precast connection design. These connections are used to create a composite section between the precast components such that the entire tower will act as a single unit.

Through the evolution of the original UHPC Lattice Tower design, a number of different constraints were recognized that affected the total cost, construction, and dimensions of the tower. In order to address each constraint with the most economical solution, three separate tower designs, using the same basic concept, were developed. From one of these three designs, operators and manufacturers may determine which option best suits each situation based on costs and site conditions. Each of the three towers uses a different combination of HSC and UHPC that changes both the member sizes and overall tower dimensions. The first of the three embodiments uses HSC columns and UHPC panels and will be referred to as the HCUP tower from here onward, where "H" refers to HSC, "C" to columns, "U" to UHPC, and "P" to panels. A similar naming convention was used for the second tower that utilizes HSC Columns and HSC Panels, which will be referred to as the HCHP tower. The last concept consists of UHPC Columns and UHPC Panels and will be referred to as the UCUP tower.

In addition to changes made to the type of material used in the tower, a single bracing element type was used. Panel members were used in place of diagonal cross-braces to allow the tower to be completely enclosed, adding additional protection to the internal components. Connections between the panels and columns were designed for each tower based on the required load demand. The design of each tower is described, including section geometry, tower capacity, and connection development. For all cases, a hub height of 328 ft (100 m) and 2.5 MW turbine were used, although other heights are contemplated.

HCUP Tower

This embodiment for the turbine tower was developed to reduce the overall cost. Although UHPC sections require significantly less material than HSC sections, the costs associated with UHPC often make it a less economical option when based solely on required material and unit cost. A drawback of this design is the increased weight of the tower. UHPC and HSC have very similar unit weights, which leads to increased tower weight when progressing towards larger sections. This has the potential to increase the foundation cost if poor soil conditions exist. If the foundation costs associated with the increased weight exceed those between the UHPC and HSC materials, one may elect to use one of the other concepts discussed later.

The dimensions and some of the general properties of the 328 ft (100 m) tall HCUP tower are set forth in the below table. The column and tower diameters, as well as the number of post-tensioning strands required, were based on the required moment capacity and the design criteria at the operational limit state, which governed the design of the tower. The capacity of the tower was considered satisfactory when none of the columns experienced complete decompression under operational loads. The clearance between the tower and tip of the blade was also limited by specifying a maximum circumscribed tower diameter of 165.3 ft (4.2 m) at 170.6 ft (52 m) below the hub height. This was done to prevent the blade from striking the tower in the case of an extreme load event.

The fundamental natural frequency of the tower was determined using a finite element model which was found to be in good agreement with Raleigh's method. In order to prevent resonance of the tower at the 1P and 3P excitations, it was required that the frequency falls between 0.30 Hz and 0.38 Hz. The 1P excitation represents the first excitation frequency of the rotor, while the 3P is used to describe the blade passing frequency of a turbine with three blades. This allowable frequency range is dependent on the type and size of the turbine used.

Dimensions and Properties for HCUP Tower

| | |
|---|---|
| HSC Column Compressive Strength, ksi (MPa) | 13 (89.63) |
| UHPC Panel Compressive Strength, ksi (MPa) | 26 (179.3) |
| Vertical Post-Tensioning Effective Stress, ksi (MPa) | 180 (1241) |
| Outer Diameter, D, at Base, in. (m) | 228 (5.79) |
| Maximum Column Diameter, $d_{col}$, at base, in. (mm) | 36 (914) |
| Number of 0.6-in. Diameter Strands, 0-110 ft (0-33.5 m) | 402 |
| Outer Diameter, D, at 110 ft, in. (m) | 156 (3.96) |
| Maximum Column Diameter 170.6 ft (52 m) Below Hub Height, in. (m) | 164.2 (4.17) |
| Outer Diameter, D, at 220 ft, in. (mm) | 132 (3.35) |
| Maximum Column Diameter, $d_{col}$, at 220 ft, in. (mm) | 29 (737) |
| Number of 0.6-in. Diameter Strands, 220-319.5 ft (0-33.5 m) | 198 |
| Outer Diameter, D, at 319.5 ft, in. (m) | 112.6 (2.86) |
| Maximum Column Diameter, $d_{col}$, at 319.5 ft, in. (mm) | 21 (533) |
| HSC Column Volume, yd$^3$ (m$^3$) | 304.6 (232.9) |
| UHPC Panel Volume, yd$^3$ (m$^3$) | 73.6 (56.3) |
| Tower Weight, kip (kN) | 1620 (7206) |
| Fundamental Tower Natural Frequency, Hz | 0.320 |
| Maximum Tower Top Drift at Extreme Limit State, % | 1.35 |

Figure 8:
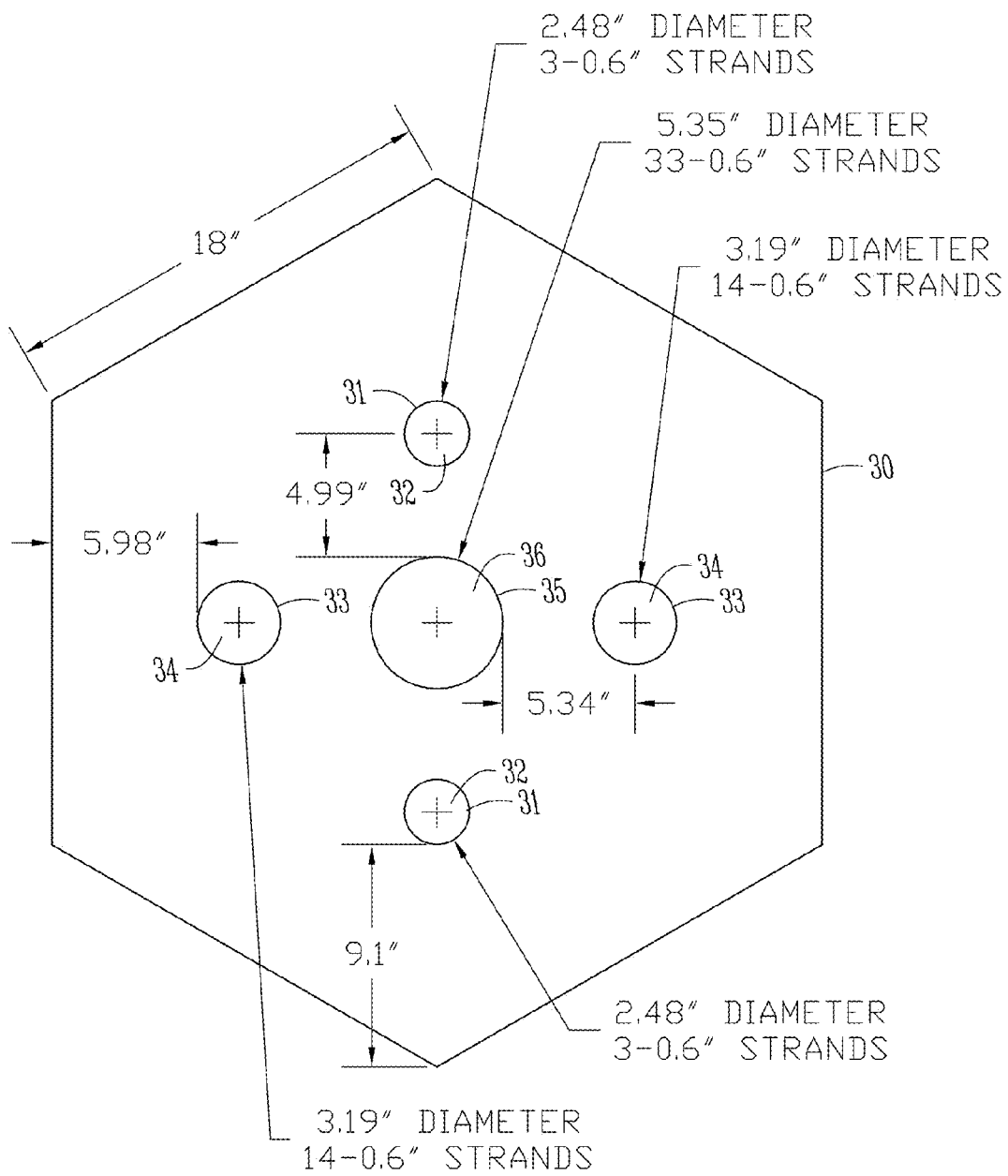
FIG. 8 illustrates an HSC hexagonal column cross-section at the base of the tower.
Figure 9:
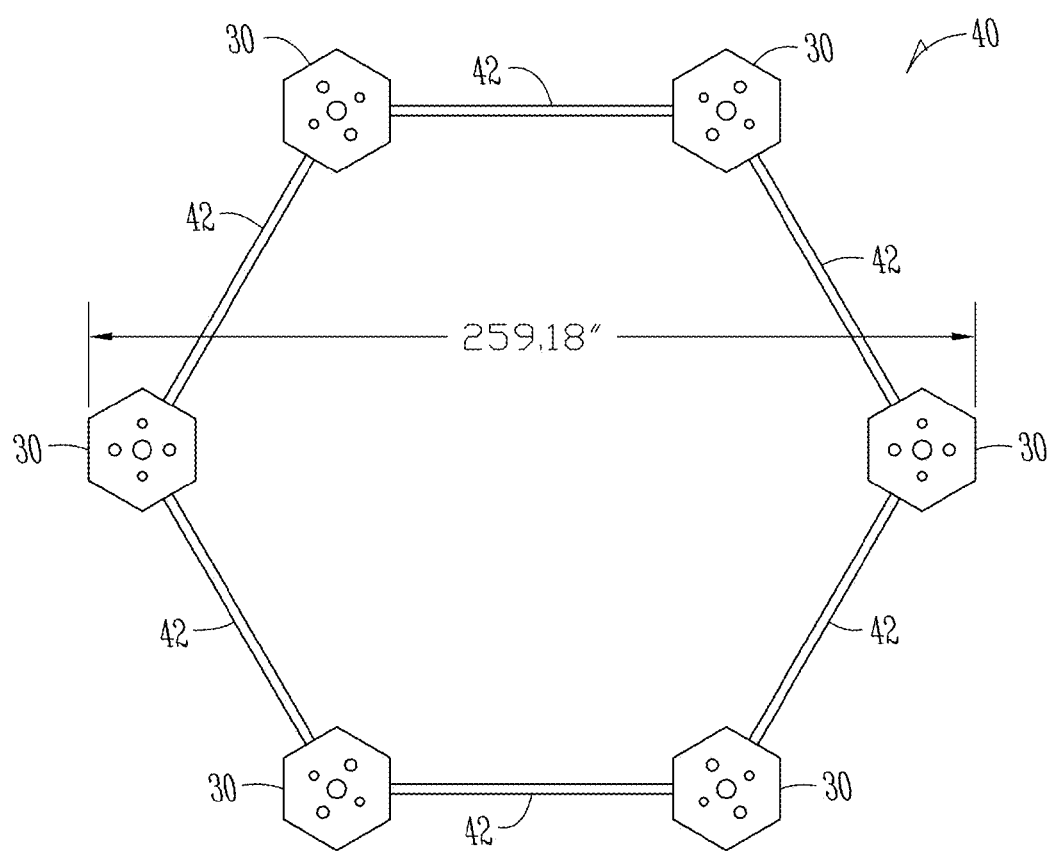
FIG. 9 illustrates a tower with HSC columns and UHPC panels (HCUP) Tower cross-section at the base.
Figure 10:
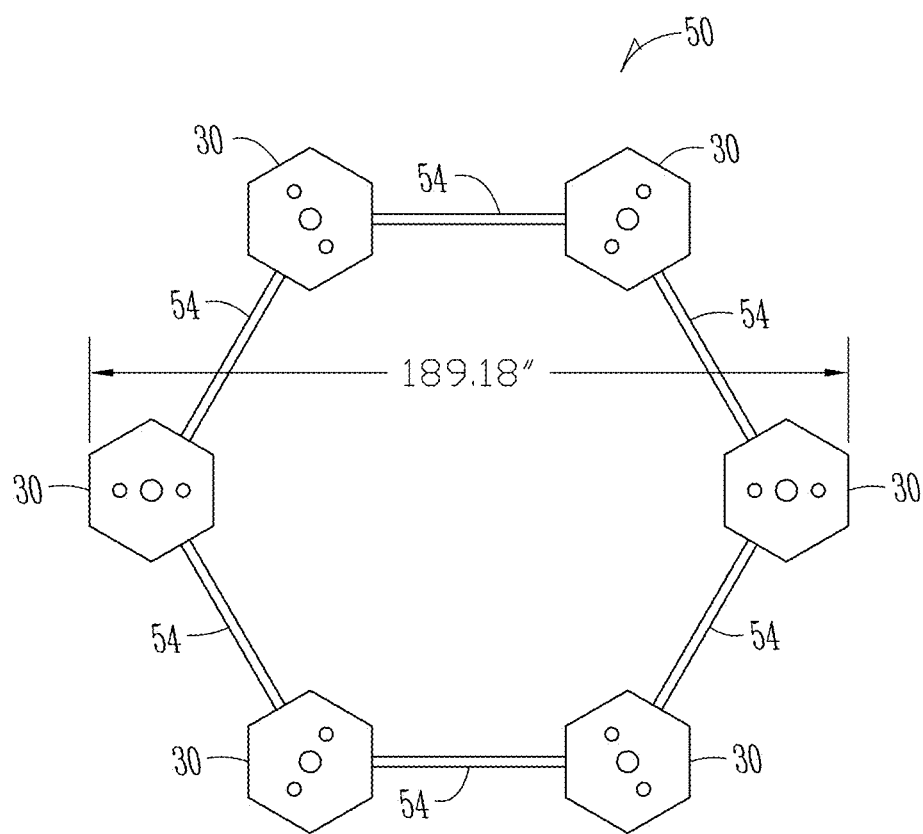
FIG. 10 illustrates an HCUP tower cross-section at 110 feet (33.5 m).
Figure 11:
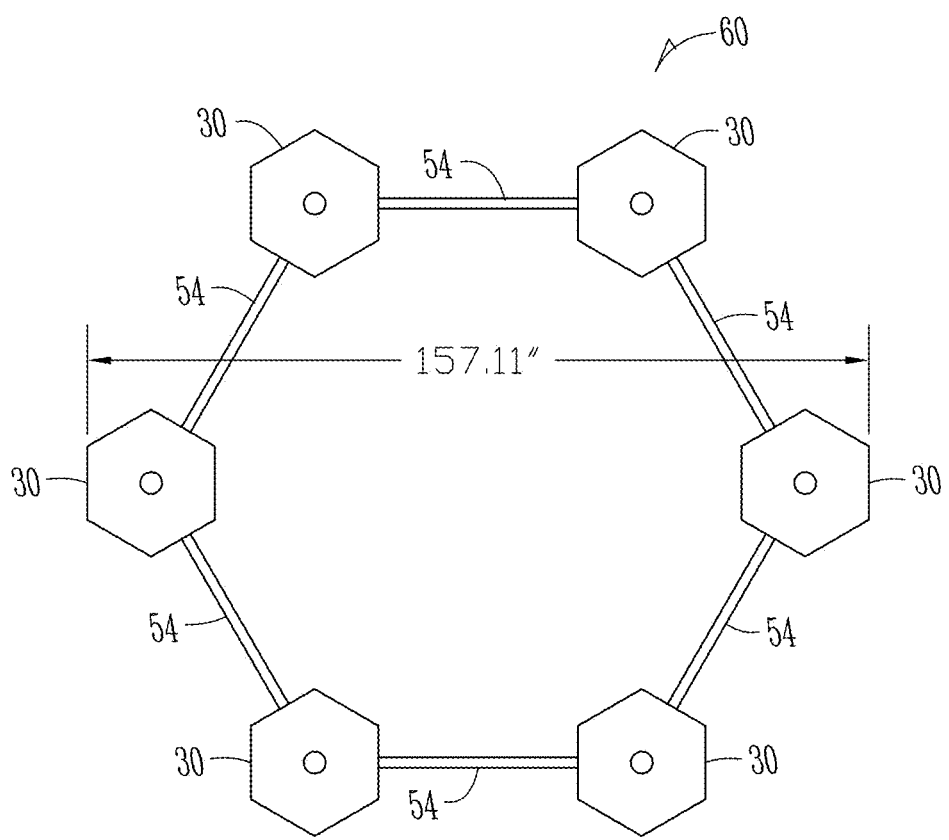
FIG. 11 illustrates an HCUP tower cross-section at 319.5 feet (97.4 m) for a 100 meter tall tower.

Each of the six columns of the tower each consists of five post-tensioning ducts. FIG. 8 shows a typical column cross-section at the base of the tower. Two of the outside ducts 31 contain a set of 3, 0.6-in. (1.52 cm) strands 32 that are to be terminated at 110 ft (33.5 m), while the other two ducts 33 contain a set of 14, 0.6-in. (1.52 cm) strands 34 which will be terminated at 220 ft (67 m). The center duct 35 contains a set of 33 0.6-in. (1.52 cm) strands 36 which extends from the foundation to the top of the tower. The complete tower cross-section at the cut-off locations can be seen in FIG. 8 through FIG. 11. The ducts shown in these cross-sections represent the duct layout directly above the given elevation or, immediately after duct termination. As shown in FIG. 9, the hexagonal cross-section 40 includes portions of six hexagonal columns 30 with panels 42 there between. As shown in FIG. 10, the hexagonal cross-section 50 includes portions of six hexagonal columns 60 with panels 54 there between. As shown in FIG. 11, the hexagonal cross-section 60 includes portions of six hexagonal columns 30 with panels 64 therebetween.

Two potential construction sequences have been proposed for assembly of the tower on site. Both affect the individual components of the tower in different ways. The first "Cell Assembly" sequence, illustrated in FIG. 12A consists of assembling sections or cells of the tower 70 at a height dependent on the precast lengths. This would likely range from 25 ft (7.6 m) to 55 ft (16.8 m) to minimize transportation costs. During this stage, the columns and panels would be connected using connections such as those described later herein. Once connected, these segments would form the perimeter of the tower. After all segments of the tower are erected at ground level, each would be stacked accordingly with post-tensioning applied at the appropriate height to secure the tower to the foundation. Post-tensioning within the columns may take place as segments reach the cut-off elevations of 110 ft (33.5 m), 220 ft (67.0 m), and 320 ft (97.5 m). With the column/panel interface connections in place, the panels will be subjected to axial compression when the vertical post-tensioning is completed. This has a positive effect on the panels, as their capacity prior to cracking is increased, but negatively effects the connections that must transfer the load between the columns and panels. This ultimately reduces their capacity to support loads on the tower.

The second "Column and Panel Assembly" sequence shown in FIG. 12B consists of erecting each of the six columns 30 independently to the elevation of one of the three post-tensioning cut-off elevations. After post-tensioning is completed, the panels 42 are placed between the erected columns 30 and fastened in place using connections such as those described later herein. With post-tensioning taking place prior to panel placement, the effects on each component is different from the first construction sequence. The benefits of having compressed panel sections are lost; however, the capacity of the interface connections is improved with the removal of residual demand. The capacity of the tower was ensured at operational, extreme, and fatigue limit states.

Operational Moment Capacity

Figure 13:
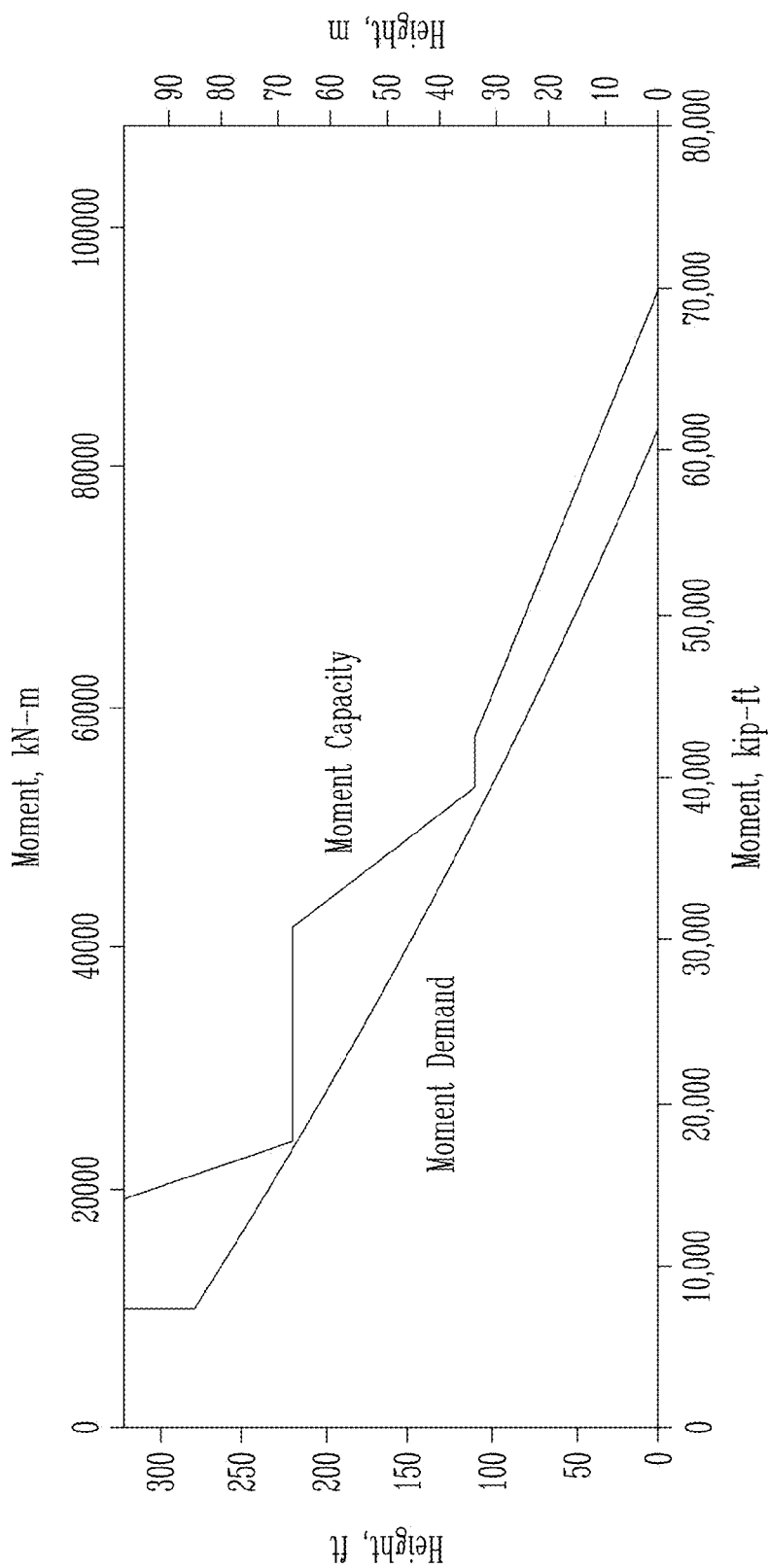
FIG. 13 is a graph showing operational moment capacity vs. demand of a HCUP-BC (i.e., HSC/HPC columns, UHPC panels and Bolted Connections).
Figure 14:
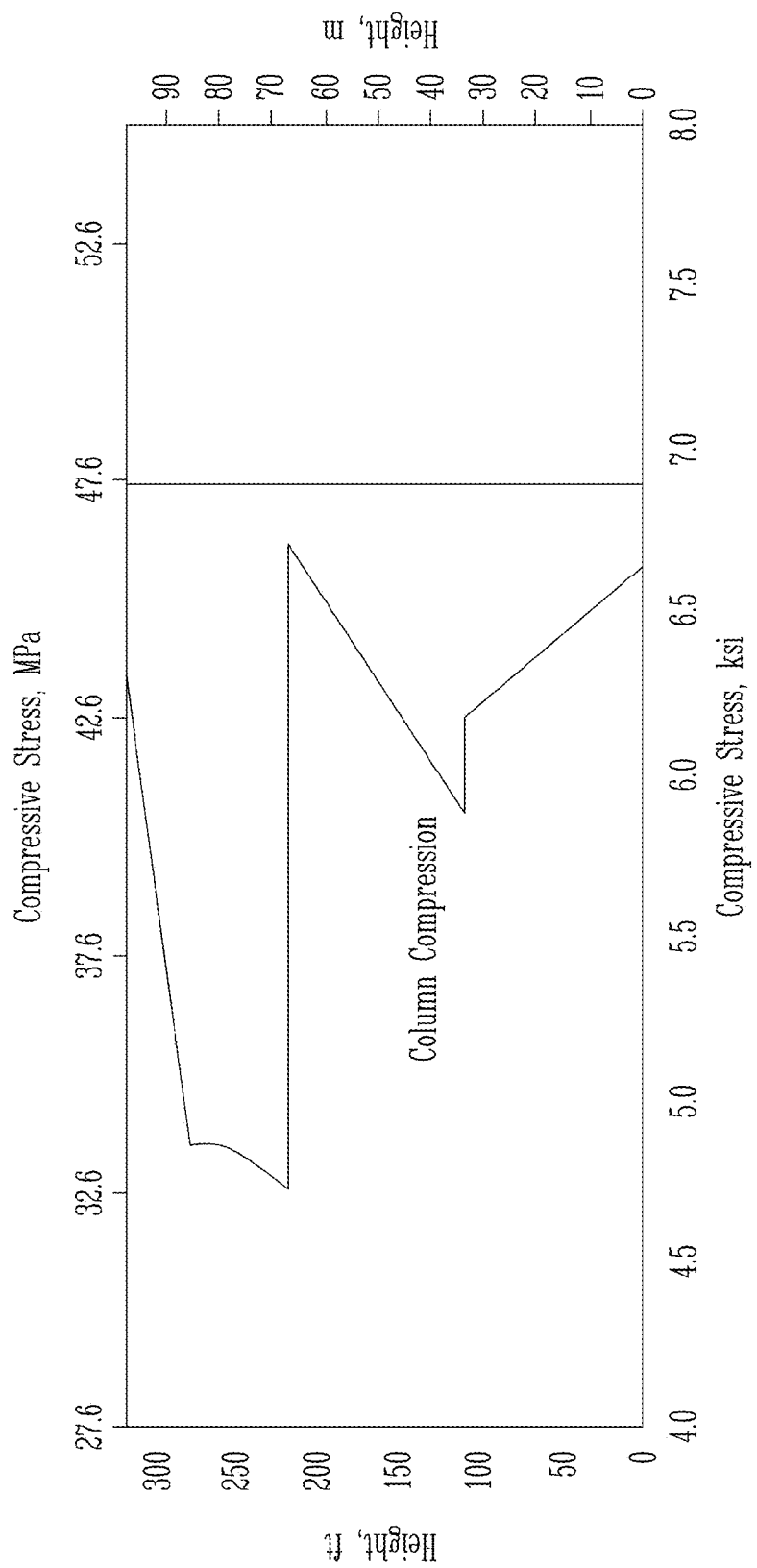
FIG. 14 is a graph showing HCUP-BC extreme compression fiber stress at operational load for a 2.5 MW turbine.

The operational moment capacity of the tower was determined under the assumption that the critical section of the tower should experience linear stress distribution about its centroid when subject to the maximum flexural demand. FIG. 13 shows the operational moment capacity of the tower along the height. The abrupt changes in moment capacity are a result of the termination of vertical post-tensioning at these locations. The extreme fiber compressive stress corresponding to the operational moment capacity is shown in FIG. 14. For the 13.0 ksi (89.6 MPa) HSC columns used, the limiting compressive stress at operational was 6.89 ksi (47.5 MPa). The abrupt changes in compression are also the result of the termination of vertical posttensioning.

Ultimate Moment Capacity

Figure 15:
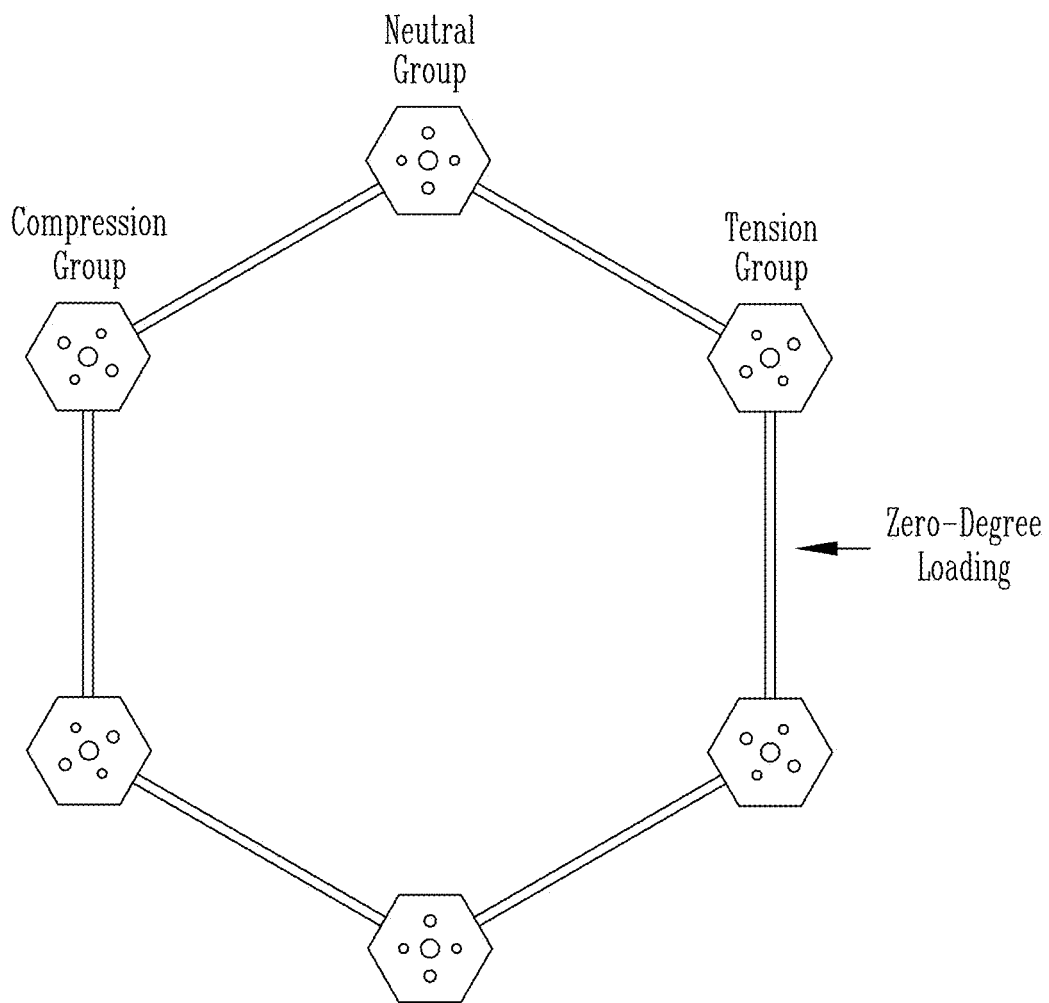
FIG. 15 illustrates labeling and grouping of columns with respect to a loading direction.

The ultimate moment capacity of the tower was determined using bonded vertical post-tensioning tendons in the columns with appropriate adjustments. This allowed for the use of strain compatibility between the concrete columns and tendons. Unlike steel reinforcement, the stress-strain curve of a post-tensioning strand does not possess a yield plateau in which stress remains constant over a period of increasing strains. For this reason, an iterative process was developed to achieve force equilibrium in the tower. The ultimate capacity of the tower was determined for both zero and thirty-degree loading conditions. For the zero-degree loading condition, the columns were separated into three distinct groups that were used for the purposes of calculating the ultimate moment capacity. FIG. 15 illustrates the position of each group with respect to the direction of loading on the tower.

Figure 16:
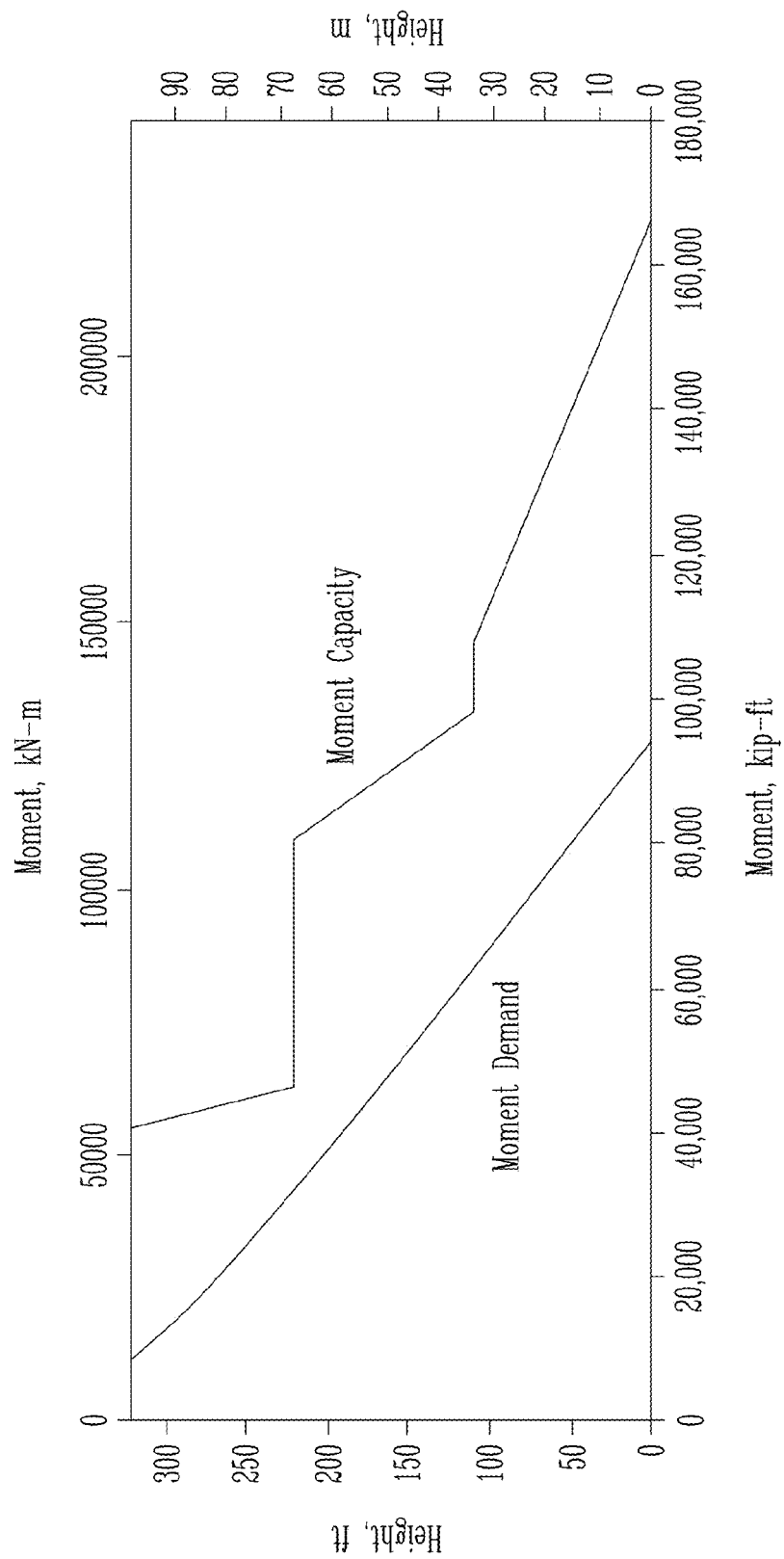
FIG. 16 is a graph showing ultimate moment capacity of the HCUP tower and extreme moment demand.

The most critical sections of the tower with respect to column stresses occur at posttensioning cut-off locations. For this reason, the ultimate moment capacity was determined at these locations as well as at the base of the tower. At the 110 ft (33.5 m) and 220 ft (67.0 m) elevations, moment capacity was determined directly above and below the post-tensioning cut-off sections to capture the change in capacity due to strand termination. FIG. 16 illustrates the comparison between the ultimate moment capacity of the section and the extreme moment demand. The ultimate capacity of the tower section was limited by 0.003 in/in concrete strain in the extreme compression fiber. The maximum tendon strain in the tower at the ultimate limit state can be found at the base of the tower at a value of 0.02092 in/in. This is well below the approximate rupture strain that occurs between 0.05 and 0.07 in/in.

Shear Capacity

The shear demand on the tower and its influence was determined by calculating the maximum principal stresses. This stress was determined and compared with the tensile strength of the concrete to examine the potential for cracking. The tensile resistance was limited by one-half its capacity to ensure cracking would not develop.

The maximum shear demand on the tower at the operational and extreme limit states results from a combination of horizontal and torsional loads. On one side of the tower, both loads are additive, while on the other side, the loads are contradicting one another. For the purpose of determining the maximum shear demand, the side of the tower experiencing additive forces was considered. The resulting shear stress is determined. Unlike the operational moment capacity of the tower, the panels were considered as part of the tower cross-section when determining the shear demand. Cracks caused by flexure typically form horizontally in the direction perpendicular to the axis of the tower, whereas shear cracks often develop diagonally over a given height. For this reason, the discretization of the panels will not adversely affect the shear capacity of the tower.

The tower experiences the largest principal tensile stress near the top. At this location, the torque, which remains relatively constant along the height, generates larger shear stresses.

The increase in torsional shear stress is caused by the reduction in tower diameter. At the base of the tower the maximum principal tensile stress was found to be 17 psi (117 KPa) at operational and 31 psi (214 KPa) at the extreme. At the top of the tower, the maximum principal tensile stress reaches 98 psi (680 KPa) and 155 psi (1070 KPa) at operational and extreme. These values fall well below the limiting tensile stress of 438 psi (3.02 MPa).

Bolted Connection Design

Figure 17:
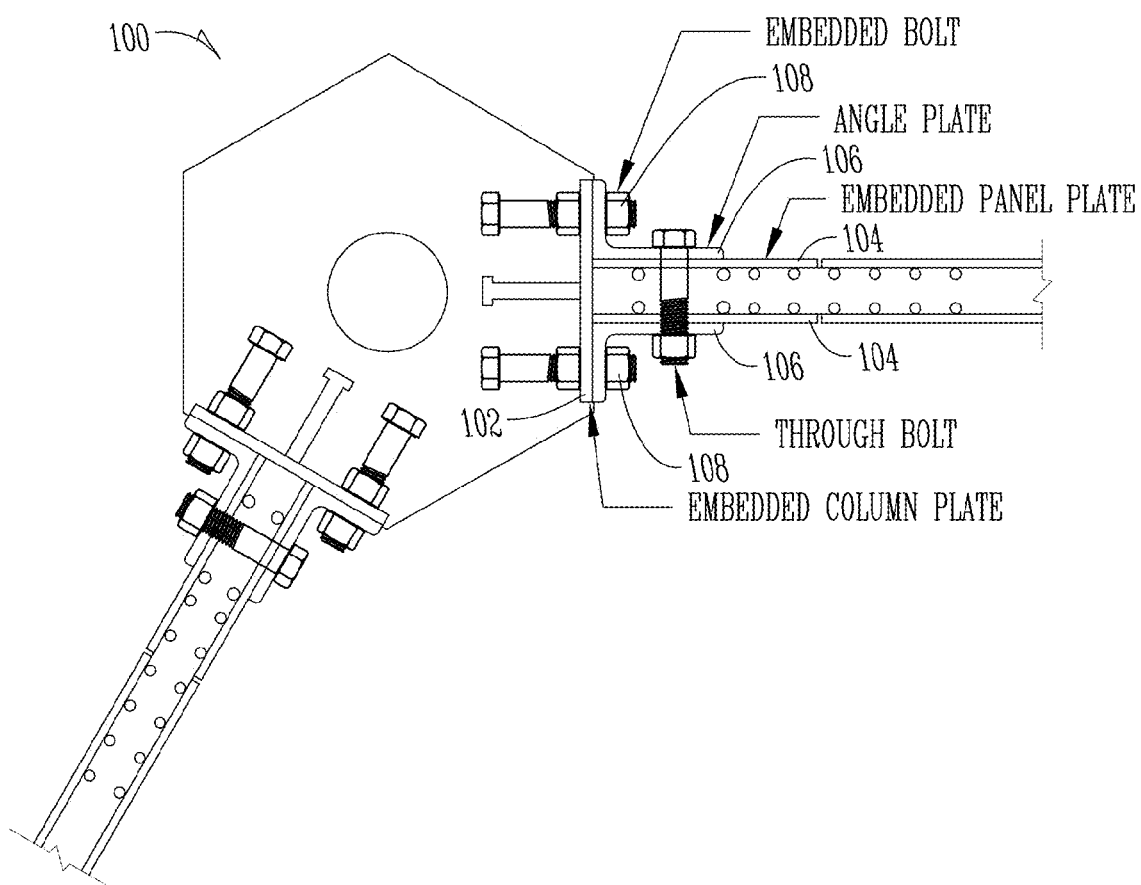
FIG. 17 is a bolted connection detail used for HCUP tower.

The connection developed for a HCUP tower was a bolted connection. A bolted connection was designed for two primary purposes. The first was to reduce on-site construction time, thereby potentially reducing the overall tower costs. The second was to provide a connection with a fatigue life equal to or greater than the 20 year service life of the tower. The required capacity of the connection was determined based on results from the finite element analysis of the complete tower model. The connection not only needed to provide adequate strength, but also adequate ductility during an extreme load event. The connection can be seen in FIG. 17.

The connection 100 at each location consists of three primary components; an embedded column plate 102, a pair of embedded panel plates 104, and angled connection plates 106. The embedded column plate 102 relies on welded shear studs and embedded bolts 108 to provide the needed capacity. Because of the small thicknesses of the panels, the embedded panel plate 104 used welded reinforcement to distribute the loads more evenly into the panel. Both of the embedded plates 104 are designed to remain elastic during the plasticization of the angled plate 106. The angled plate 106 was designed to undergo significant inelastic behavior in the case of an extreme loading event, protecting the embedded plate components of the connection. This would not only reduce the total energy absorption, but also simplify the inspection and replacement process keeping maintenance costs low.

The tolerances associated with bolted connections in steel structures are often very small. For precast concrete structures, bolted connections with standard hole sizes may potentially lead to construction challenges, as the tolerances required of precasters is often greater than the tolerance of the bolt holes. For this reason, oversized holes were created in the embedded panel plates. The connection between the embedded panel plates and angled plates was design as a slip-critical connection. Slip-critical connections with oversized holes may be used. For this type of connection it is necessary to use high strength bolts to allow for pretensioning. A325 bolts were used in both the bearing connection between the angled plate and column as well as the slip-critical connection between the panel and angled plate. A bearing connection refers to an interface in which the connected components rely on the bolt area to provide shear resistance rather than friction generated by pretensioned bolts.

Figure 18:
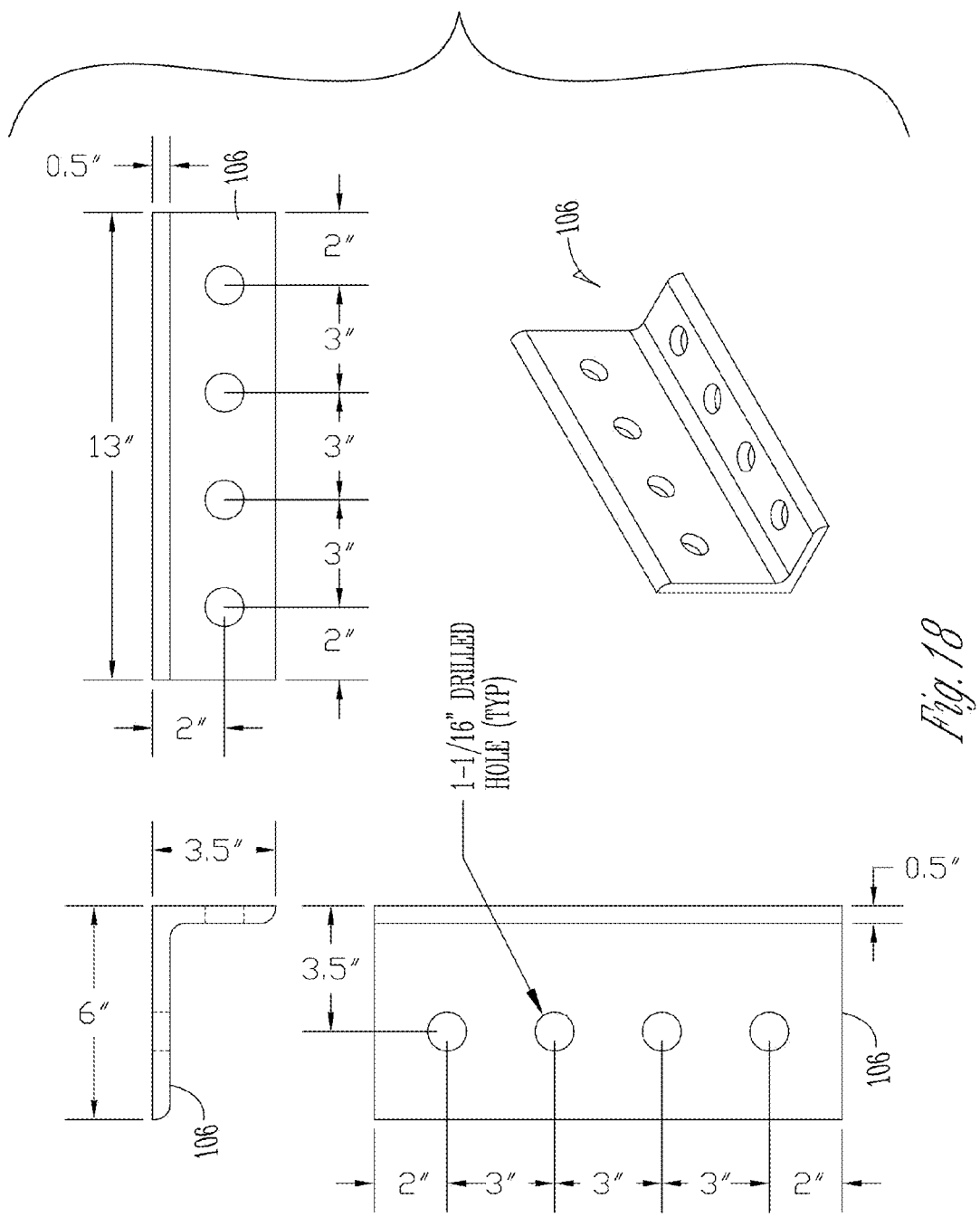
FIG. 18 illustrates selected components of bolted connection detail used for HCUP tower.

Using the finite element analysis program, ANSYS, the capacity of the angled plate was determined for the condition of pure shear at the column/panel interface. Using nonlinear elements, a force-displacement curve was generated for the angled plate. FIG. 18 shows the details of the plate as well as the three-dimensional non-linear model used in the analysis. A process of trial and error was used to determine size of plate needed to achieve the desired strength and ductility. The first step was to estimate a plate size and derive its force-displacement response. This was then applied to the connections used in the complete tower model generated in SAP2000. A nonlinear analysis was run in SAP2000 using the most detrimental load combinations for both the operational and extreme limit states. The most critical connection on the tower was then located and its resultant force determined. For the operational limit state, it was considered undesirable to have any of the angled plates on the tower exhibit nonlinear behavior. For the extreme limit state, a small degree of nonlinear behavior was acceptable. The final size and yield strength of the plate was determined by adjusting these properties in the ANSYS model and applying them back to the tower model in SAP2000.

Figure 19:
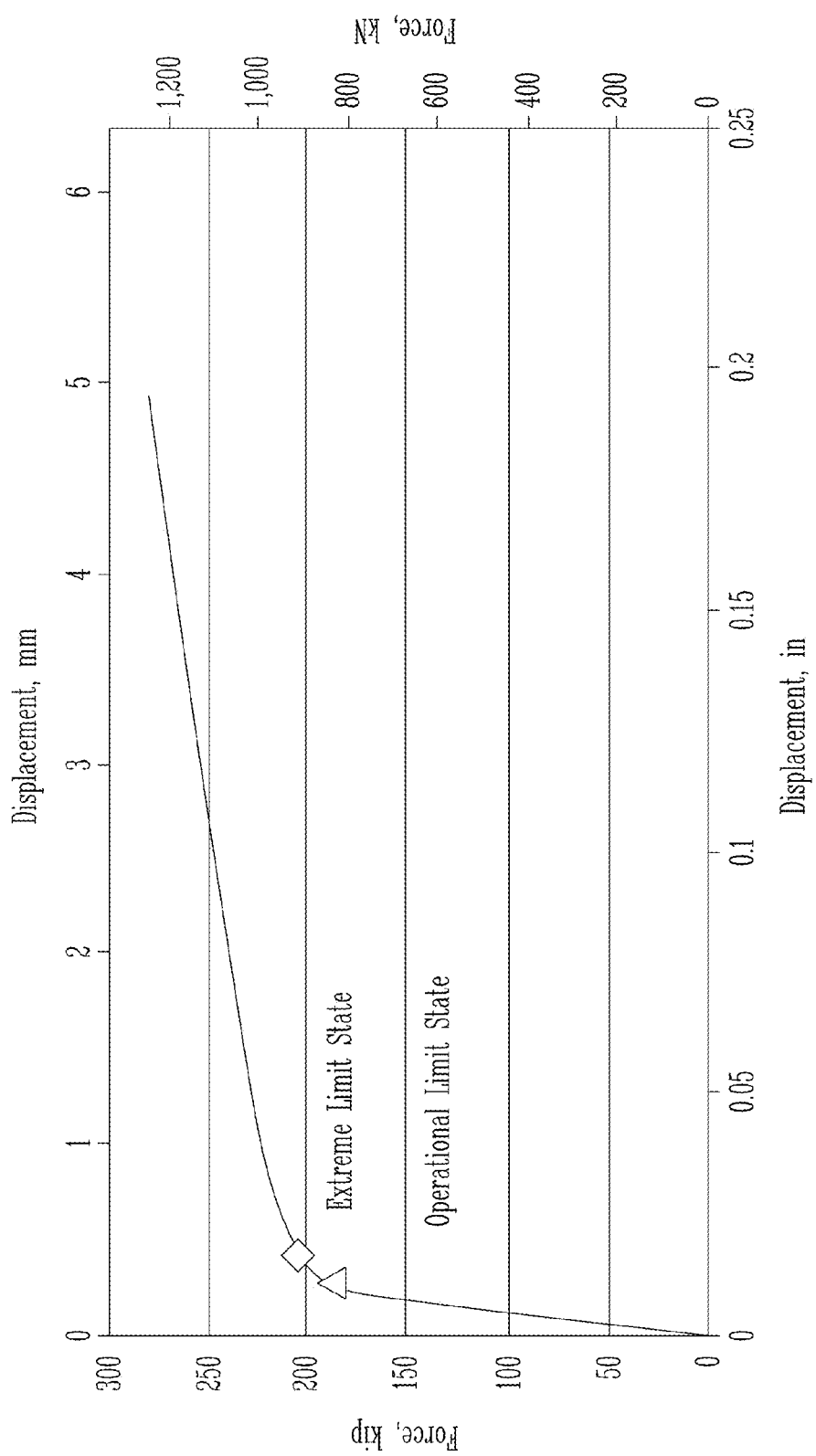
FIG. 19 is a graph illustrating a force-displacement response of a bolted HCUP column-panel connection unit under in-plane loading.

The force-displacement behavior of two plates can be seen in FIG. 19. The curve was generated using two plates, which represented a single connection between the columns and panels. Each connection consisted of a plate on the front and back side of the panel. The predicted response of the most extreme tower connection, at both the operational and extreme limit states, was identified on the force-displacement curve. Each plate was expected to experience some degree of nonlinear behavior at the operational limit state. When observing the model, the region of the plate exceeding the estimated yield strength was found to be concentrated at the ninety degree bend. The stress level in this region only slightly exceeded the yield capacity. In addition, the demand on the critical connection, which is found at the tower top, is significantly higher than the other connections on the tower. For these reasons, the connection was deemed satisfactory if designed for the operational limit state.

As previously mentioned, the embedded column plate was designed to remain elastic throughout the inelastic behavior of the angled plate. PCI (2004) was used to determine the capacity of the embedded plate and attached shear studs. Tension and shear breakout strengths as well as individual stud pullout strengths were each determined using as well as the tensile breakout strength of the concrete.

Figure 20:
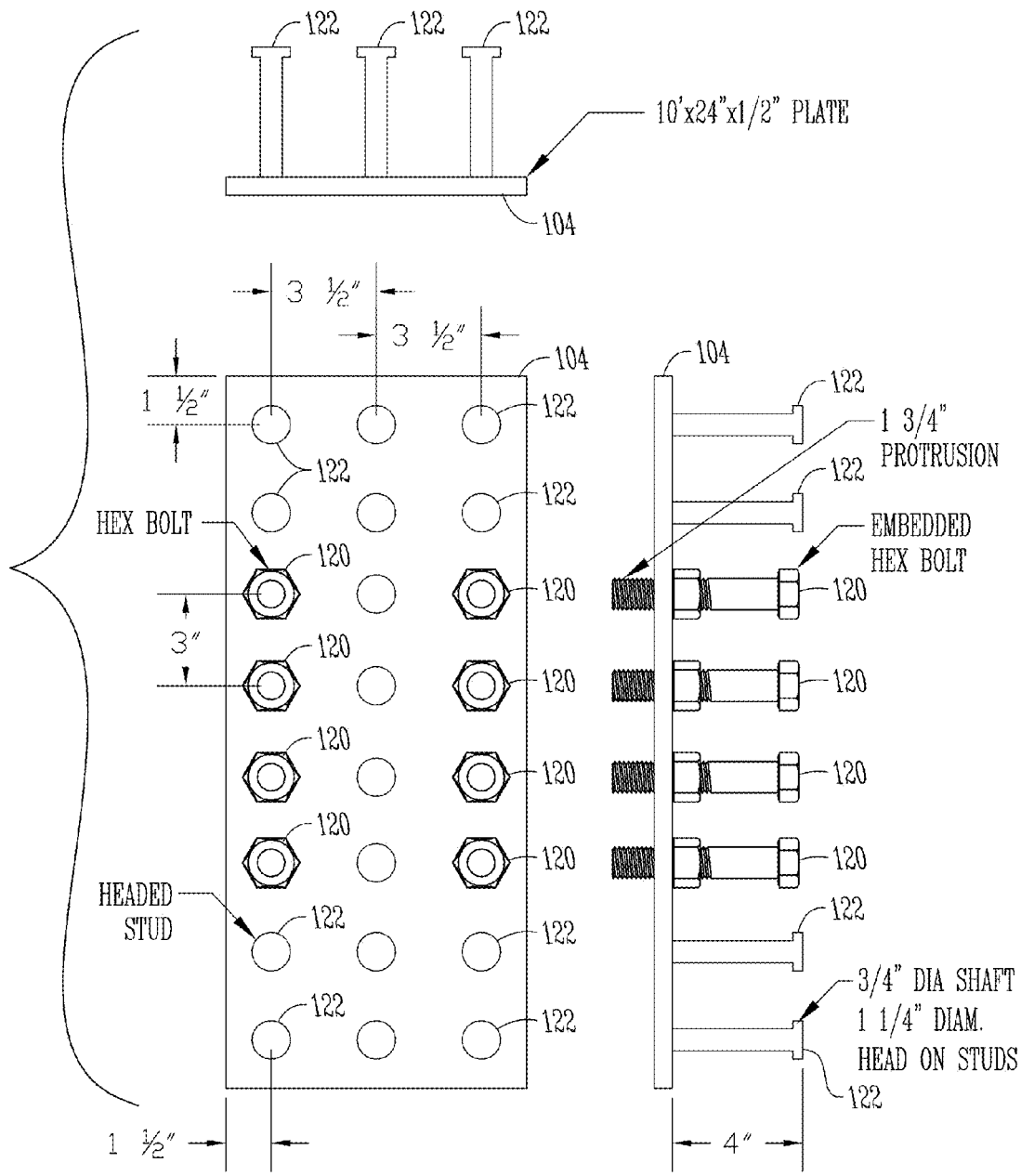
FIG. 20 illustrates a HCUP embedded column plate detail.

The final details of the designed plate can be seen in FIG. 20. Embedded hex bolts 120 replaced eight of the shear studs 122 in the group in order to attach the angled plate to the embedded column plate. The bearing area of the bolt head was similar to that of the ¾-in. (1.91 cm) shear studs and was therefore considered an acceptable replacement. The bolt ends protruding from the embedded plate 104 are to provide a connection to the angled plate.

Figure 21:
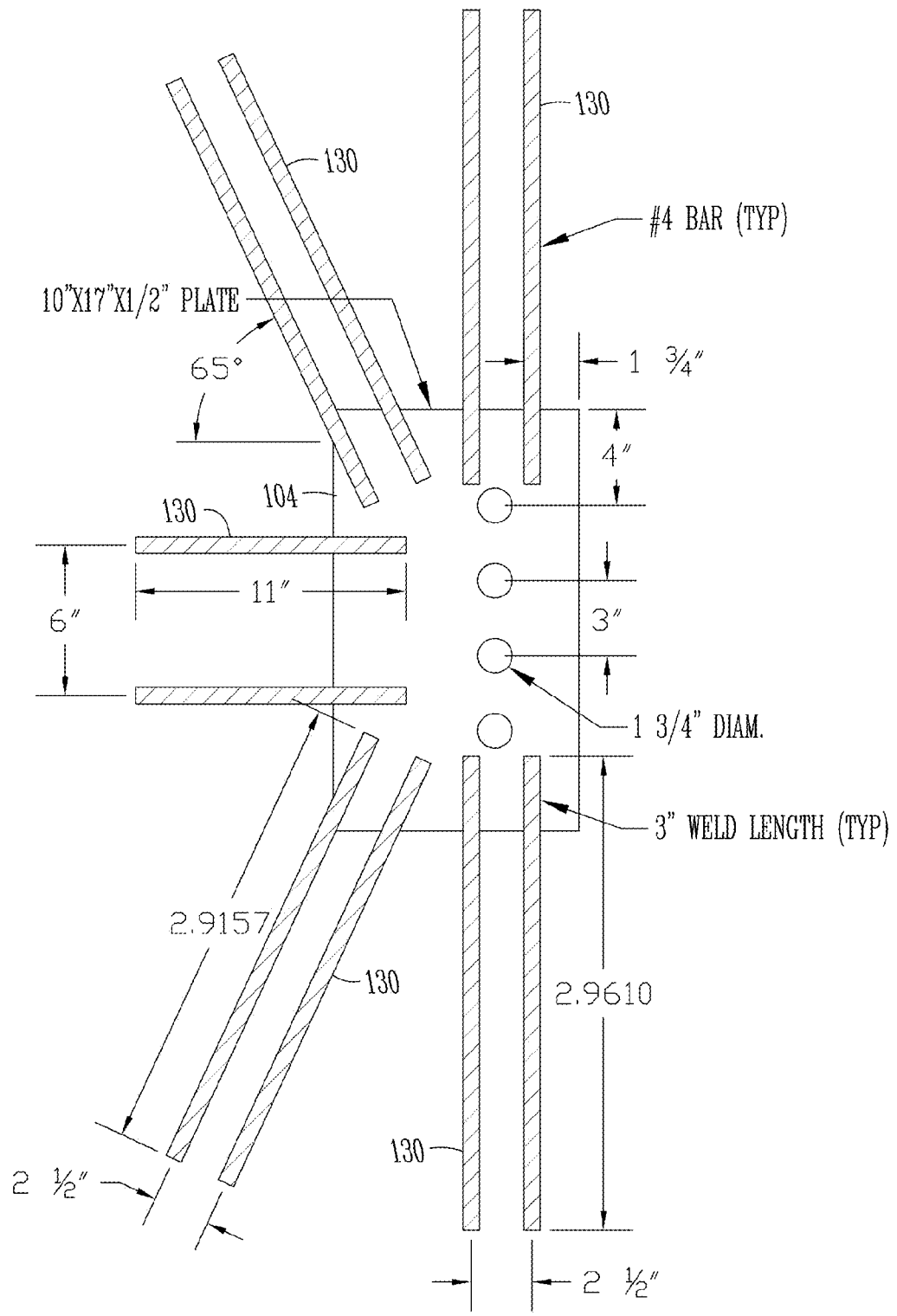
FIG. 21 illustrates HCUP embedded panel plate detail.

Much like the embedded column plate, the embedded panel plate was also designed to remain elastic during the extreme loading condition of the tower. The number and size of the welded reinforcing bars 130 on the plate 104 can be seen in FIG. 21. The bars 130 were designed to support 100% of the load demand on the plate 104. Excess length of reinforcement may be used to reinforce the panel in the connection region.

HCHP Tower

In many ways, the HCHP tower is very similar to the HCUP tower. The diameter of the tower and columns along the height are nearly identical. The variation between the two comes from the type of panels being used. Unlike the other two concepts, this design was not driven by the need to reduce costs or tower weight, but by the type of connection that would be used at the interface of the columns and panels. In order to allow for the use of a UHPC wet joint, described later in the section, the thickness of the panel needed to be increased. Given the requirements of a larger thickness, it was possible to use a reinforced HSC mix rather than UHPC. The use of HSC in the panels rather than UHPC, does provide some cost reduction; however, in situ UHPC is still used in the interface joint. This, along with the need for additional reinforcement in the panels, makes the added cost benefit of HSC panels relatively small. The general properties and dimensions of the tower at various elevations are presented in the below table.

Due to the increased rigidity of the interface connection and thicker panels used in this tower design, the fundamental tower natural frequency was found to be higher than that of the HCUP tower. A comparison of both the computer model and Rayleigh's method resulted in a difference of 12%, with Rayleigh's method having the higher frequency. It is believed the variation is a result of the assumed displacement function used in the Rayleigh's method.

| | |
|---|---|
| Column Compressive Strength, ksi (MPa) | 13 (89.63) |
| Panel Compressive Strength, ksi (MPa) | 13 (179.3) |
| Post-Tensioning Effective Stress, ksi (MPa) | 180 (1241) |
| Outer Diameter, D, at Base, in. (m) | 228 (5.79) |
| Maximum Column Diameter, $d_{col}$, at base, in. (mm) | 36 (914) |
| Number of 0.6-in Diameter Strands, 0-110 ft (0-33.5 m) | 402 |
| Outer Diameter, D, at 110 ft, in. (mm) | 156 (3.96) |
| Maximum Column Diameter, $d_{col}$, at 110 ft, in. (mm) | 36 (914) |
| Number of 0.6-in, Diameter Strands, 110-220 ft (0-33.5 m) | 366 |
| Maximum Diameter 170.6 ft (52 m) Below Hub Height, in. (m) | 164.2 (4.17) |
| Outer Diameter, D, at 220 ft, in. (m) | 132 (3.35) |
| Maximum Column Diameter, $d_{col}$, at 220 ft, in. (mm) | 29 (737) |
| Number of 0.6-in. Diameter Strands, 220-319.5 ft (0-33.5 m) | 198 |
| Outer Diameter, D, at 319.5 ft, in. (m) | 112.6 (2.86) |

| | |
|---|---|
| Maximum Column Diameter, $d_{col}$, at 319.5 ft, in. (mm) | 21 (533) |
| HSC Column Volume, yd³ (m³) | 304.6 (232.9) |
| HSC Panel Volume, yd³ (m³) | 147.1 (112.5) |
| Tower Weight, kip (kN) | 1907 (8481) |
| Fundamental Tower Natural Frequency, Hz | 0.340 |
| Maximum Tower Top Drift at Extreme Limit State, % | 0.99 |

Figure 22:
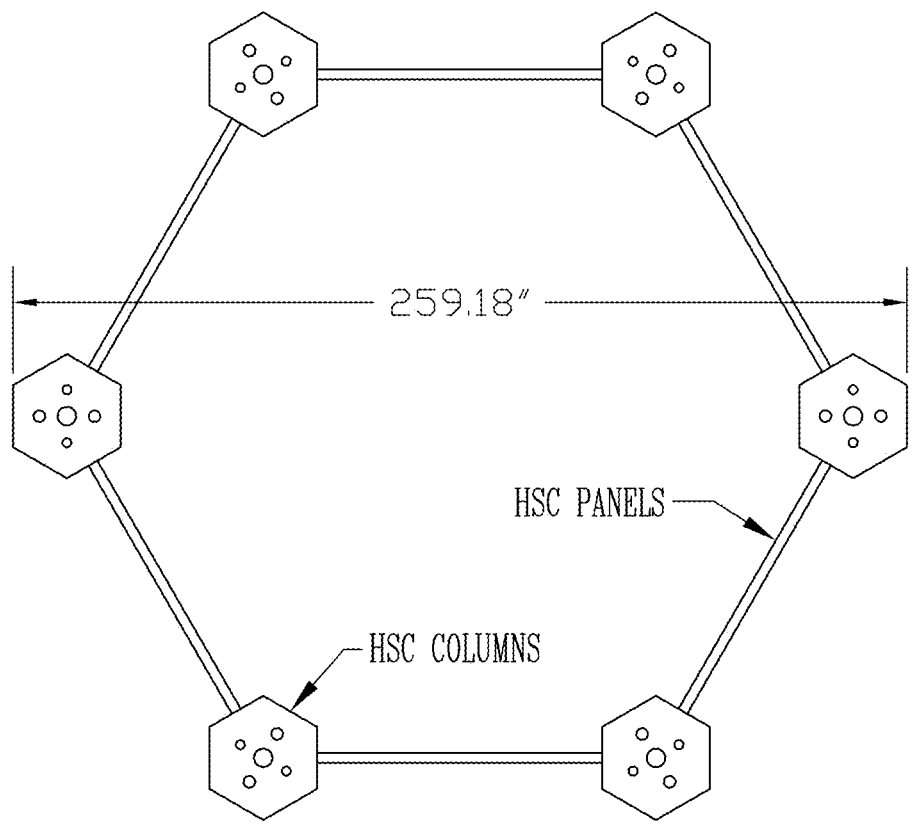
FIG. 22 illustrates a cross-section of the base of the HCHP tower.

The size of ducts used within the columns as well as the spacing between each can be seen in FIG. 9. The tower cross section at the base of the HCHP tower has been illustrated in FIG. 22. The only variation between base cross-section of the HCUP and HCHP tower is the increased panel thickness. The outside diameter of the tower at 110 ft (33.5 m), 220 ft (67.0 m), and the tower top, is the same as the HCUP concept shown in FIG. 11 through FIG. 13.

Operational Moment Capacity

Figure 23:
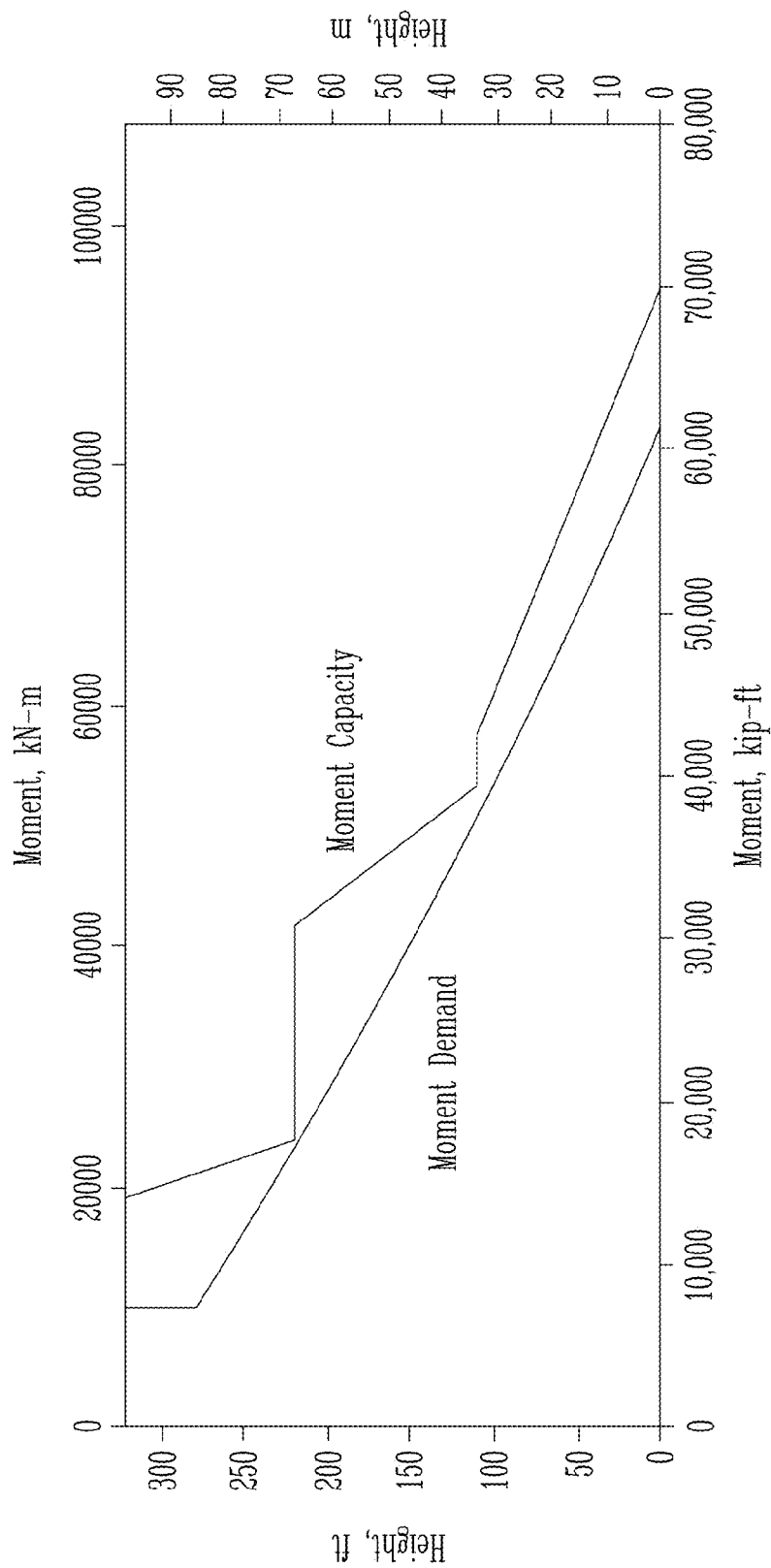
FIG. 23 is a graph showing operational moment capacity vs. demand of the HCHP tower.
Figure 24:
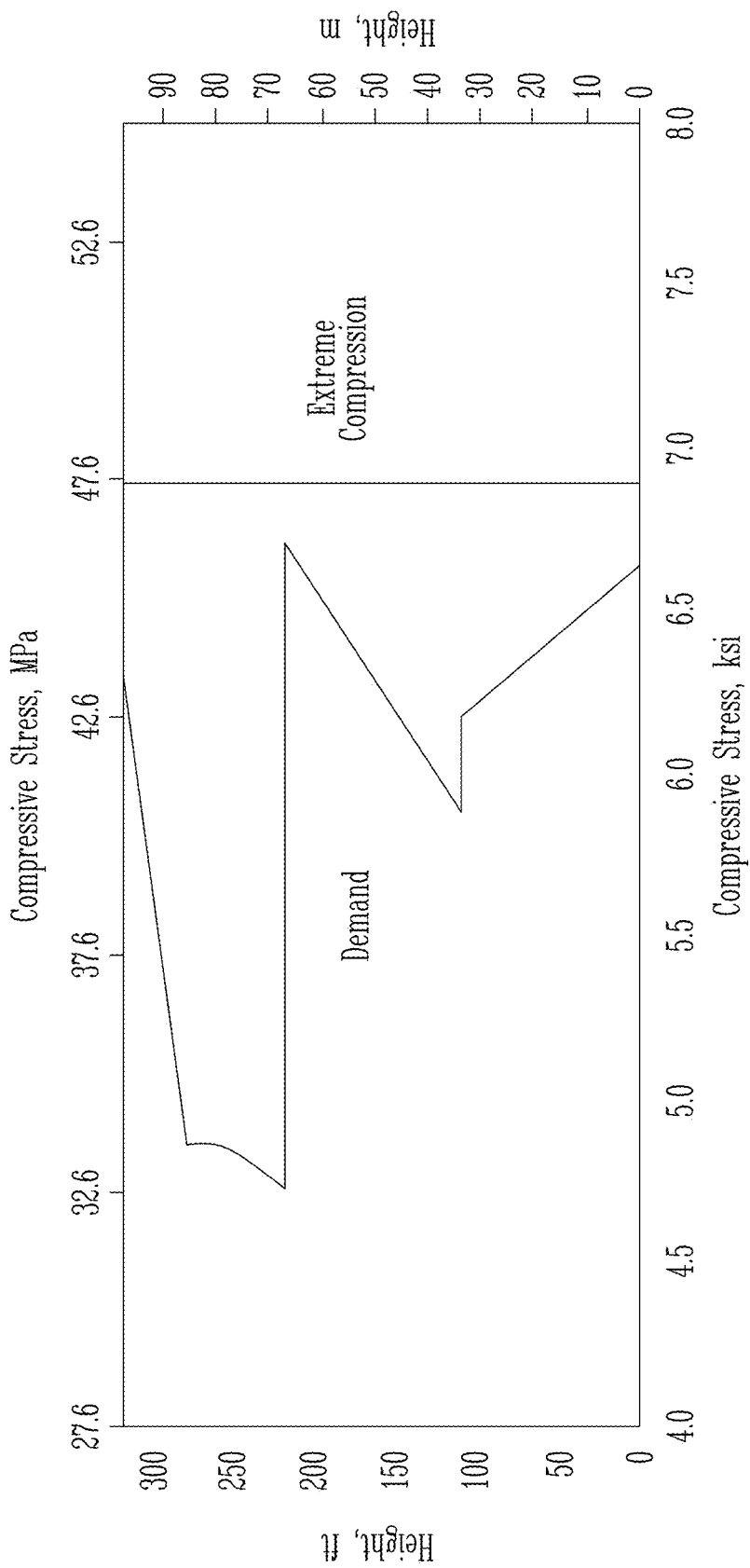
FIG. 24 is a graph showing extreme compression fiber stress at operational moment of the HCHP tower for a 2.5 MW turbine.

The locations governing the design at the operational moment capacity can be found just above the 110 ft (33.5 m) and 220 ft (67.0 m) elevations. Here, moment demand is the same for a section containing all five post-tensioning tendons and the section containing three tendons. As tendons are terminated the moment capacity of the tower at the given elevations was reduced as seen in FIG. 23. FIG. 24 illustrates the extreme compression fiber stress at operational moment capacity of the HCHP tower.

Ultimate Moment Capacity

Figure 25:
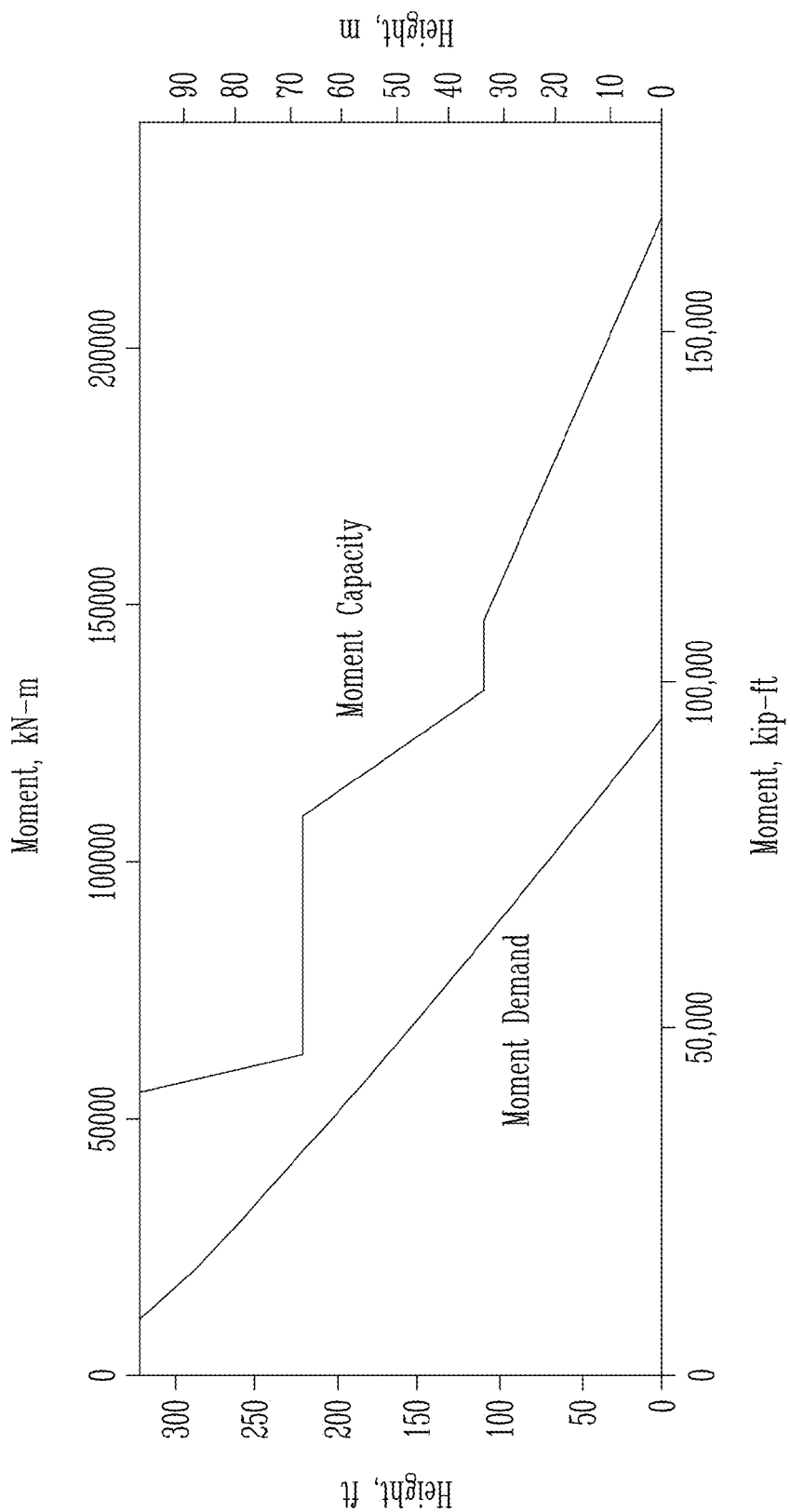
FIG. 25 is a graph showing ultimate moment capacity vs. demand of the HCHP tower.

The resulting ultimate moment capacity and moment demand curves for the HCUP tower are shown in FIG. 25. A concrete compression strain of 0.003 in/in once again governed the capacity of the tower. If assumed to be perfectly bonded, the maximum post-tensioning tendon strain occurs at the base of the tower at a value of 0.021 in/in.

Shear Capacity

The shear capacity was determined. With the section properties that result from an increased panel thickness, the maximum principal tensile stresses at the different limit states were reduced. At the base of the tower, the stress within the panel was limited to 10 psi (69 KPa) at operational and 12 psi (83 KPa) at extreme. The most critical location for principal tensile stresses in the tower was at the top. However, the tensile stresses in the tower fell well below the tensile capacity of the concrete; therefor, shear cracks were not expected to develop.

UHPC Wet Joint Connection

Figure 26:
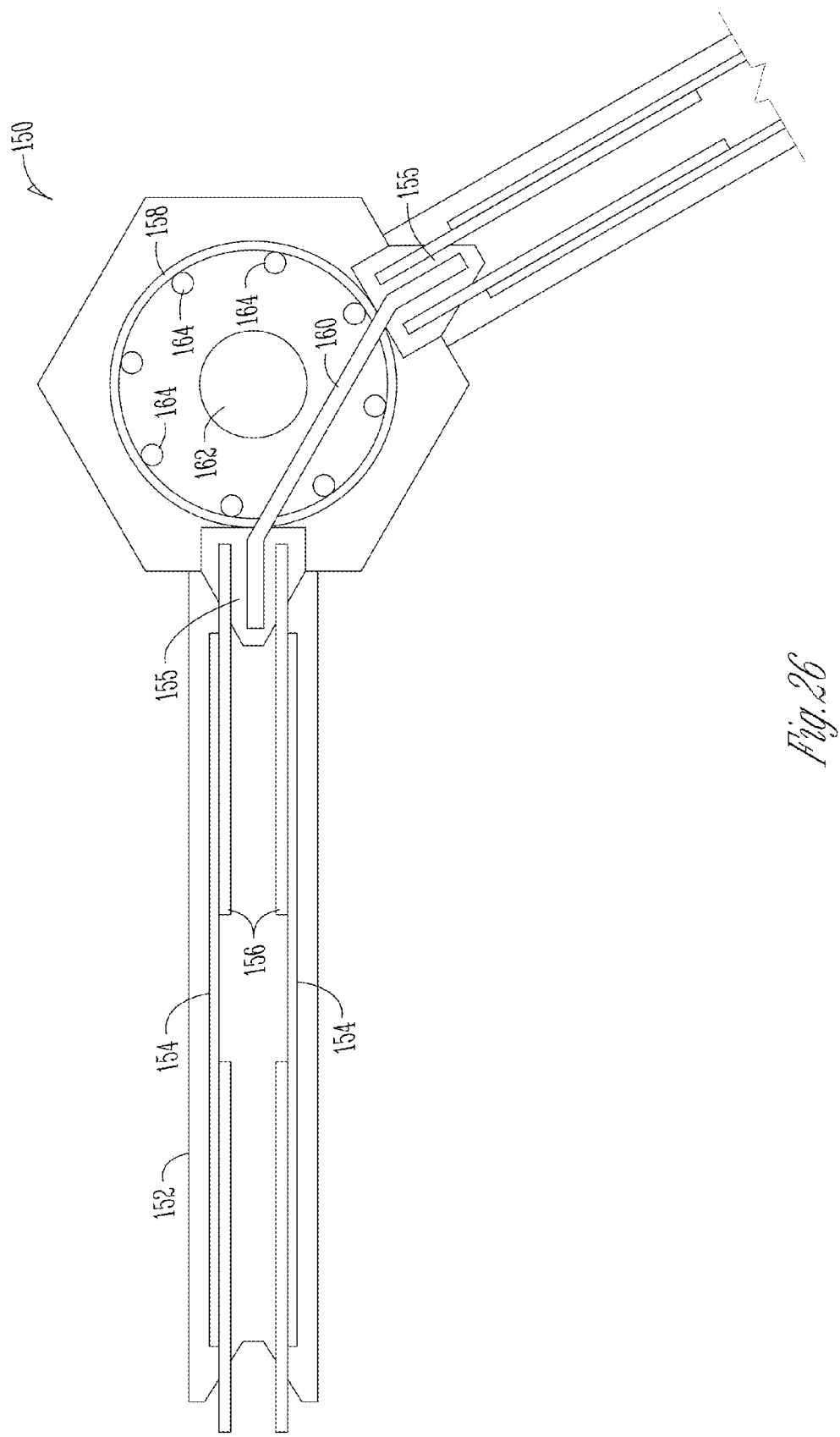
FIG. 26 illustrates UHPC wet joint connection details.

With the increased thickness of the high-strength concrete panel, the use of a wet joint connection at the column/panel interface becomes a more feasible option. The wet-joint developed for the HCHP tower can be seen in FIG. 26. In FIG. 26, the wet joint connection 150 is shown. An HSC panel 154 is shown with welded wire fabric 154, and bars 156, 160, 164 of various types provided. A spiral 165 is shown and the central post-tensioning duct 162 is shown. The use of UHPC 155 as joint filler was chosen based on the allowable reduction in development lengths for the reinforcement. By providing a pocket in both the column and panel, adequate development lengths can be achieved for the bar size required to resist the shear and tensile forces at the interface. With the absence of large aggregate in UHPC, the material has much greater flow characteristic than lower strength concretes. This allows it to flow freely through the tight bar spacing of the connection. One of the challenges associated with this type of connection is the vertical orientation of the joint. UHPC would need to be placed from the top of the section, which could be as high as twenty-five feet. Additional testing would need to be completed to verify adequate consolidation takes place along the entire height of the joint. Special consideration would also need to be given to the separation of fibers and concrete near the bottom of the joint. Shoring would be required to cast the joints on site, adding to the overall cost and erection time. With the rapid strength gain characteristics of UHPC however, formwork could potentially be removed the same day casting takes place. According to FHWA (2012) the one, three, and seven-day compressive strengths of UHPC are approximately 13.0 ksi (89.6 MPa), 17.5 (121 MPa), and 20.0 ksi (138 MPa).

In order to provide additional tolerance in the spacing between columns, the two pockets within each column were designed at different widths. One side of the panel will rest outside of the pocket, providing an enclosed void for the UHPC. The other side will have the ability to slide into the column pocket an additional half of an inch. This is best illustrated in FIG. 26.

UCUP Tower

The UCUP tower was designed to reduce the overall weight of the tower by taking advantage of the improved material properties of UHPC. The tower would be well-suited for project sites that have poor soil conditions, requiring a more intensive foundation design. The reduced tower weight would also lead to a reduction in the delivery costs of the precast concrete segments. The overall cost of the UCUP tower has a much greater potential to decrease over time when compared to the previous two concepts. The cost of UHPC makes up a large percentage of the total tower cost. If the demand for UHPC increases in the near future, the unit cost of the material may be reduced. Both the HCUP and HCHP towers utilize HSC, which is unlikely to see a significant change in unit cost in the near future. The benefit UHPC has over tradition concrete is not limited to the increased compressive and tensile strengths. The material also performs better in highly corrosive environments such as coastal regions. The UCUP tower dimensions and general properties are provided in the below table. The overall tower diameter remained unchanged from the previous two models; however, the column diameters are significantly reduced.

Dimensions and Properties of UCUP Tower

| | |
|---|---|
| Column Compressive Strength, ksi (MPa) | 26 (89.63) |
| Panel Compressive Strength, ksi (MPa) | 13 (179.3) |
| Post-Tensioning Effective Stress, ksi (MPa) | 180 (1241) |
| Outer Diameter, D, at Base, in. (m) | 228 (5.79) |
| Maximum Column Diameter, $d_{col}$, at base, in. (mm) | 25.5 (648) |
| Number of 0.6-in Diameter Strands, 0-110 ft (0-33.5 m) | 390 |
| Outer Diameter, D, at 110 ft, in. (mm) | 160 (4.06) |
| Maximum Column Diameter, $d_{col}$, at 110 ft, in. (mm) | 25.5 (648) |
| Number of 0.6-in, Diameter Strands, 110-220 ft (0-33.5 m) | 354 |
| Maximum Diameter 170.6 ft (52 m) Below Hub Height, in. (m) | 162.5 (4.13) |
| Outer Diameter, D, at 220 ft, in. (m) | 134 (3.40) |
| Maximum Column Diameter, $d_{col}$, at 220 ft, in. (mm) | 20 (508) |
| Number of 0.6-in. Diameter Strands, 220-319.5 ft (0-33.5 m) | 210 |
| Outer Diameter, D, at 319.5 ft, in. (m) | 112.6 (2.86) |
| Maximum Column Diameter, $d_{col}$, at 319.5 ft, in. (mm) | 17 (431.8) |
| UHPC Column Volume, yd³ (m³) | 145.1 (110.9) |
| HSC Panel Volume, yd³ (m³) | 173.2 (132.4) |
| Tower Weight, kip (kN) | 1384 (6156) |
| Fundamental Tower Natural Frequency, Hz | 0.293 |
| Maximum Tower Top Drift at Extreme Limit State, % | 1.68 |

Operational Moment Capacity

Figure 27:
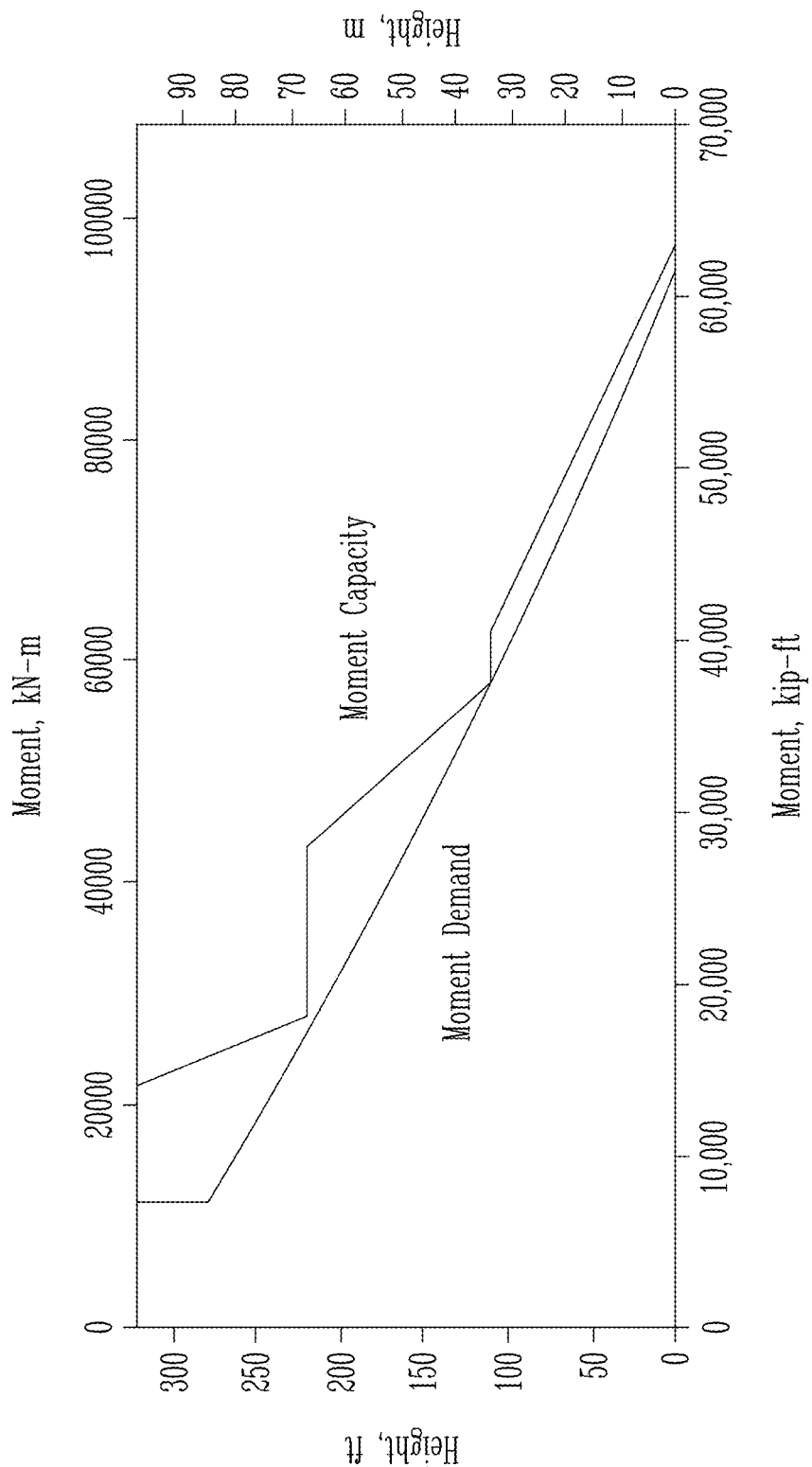
FIG. 27 is a graph illustrating operational moment capacity vs. Demand of a UCUP tower.
Figure 28:
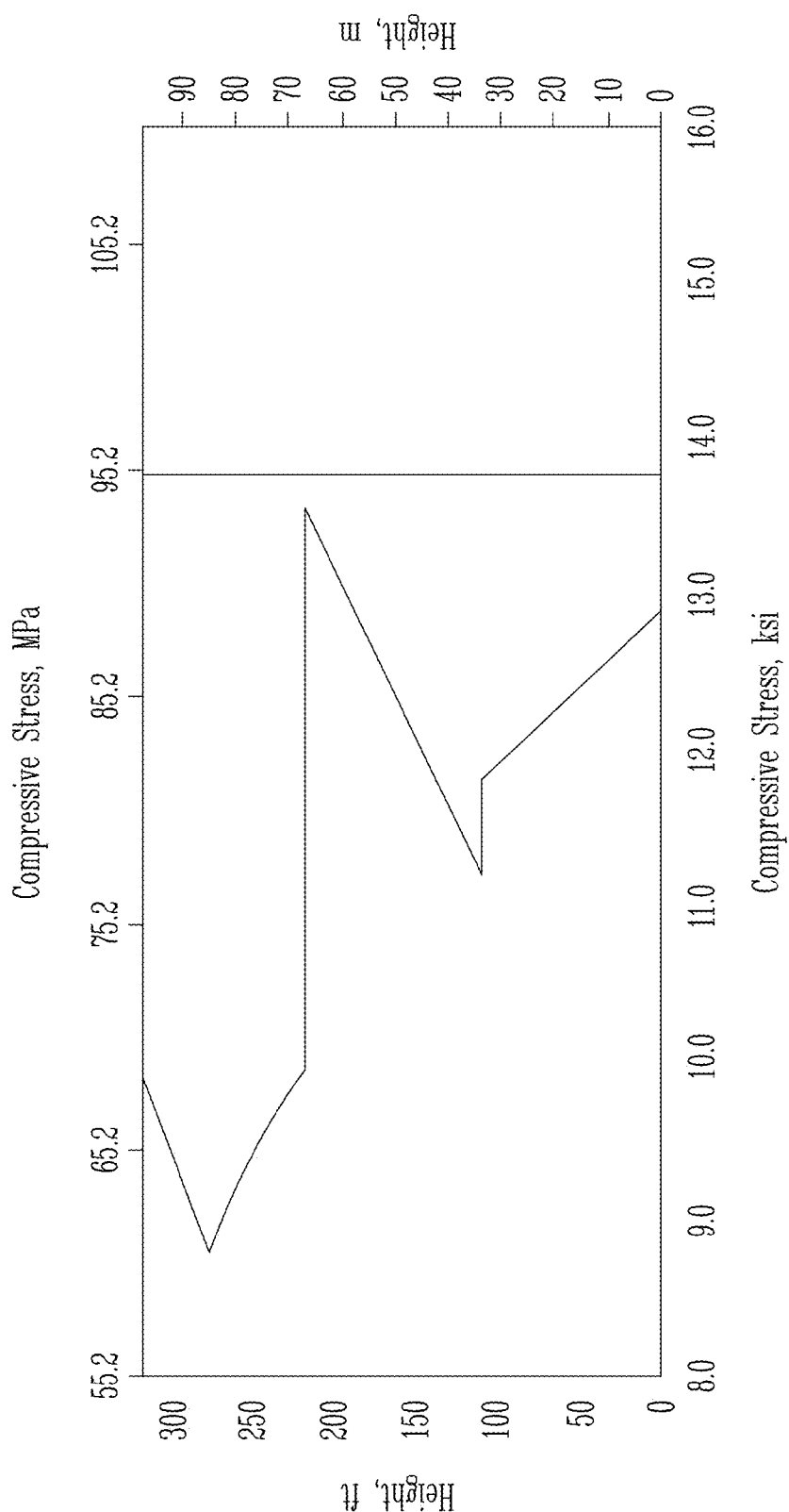
FIG. 28 is a graph illustrating extreme compression fiber at operational loads for a 2.5 MW turbine.

The operational moment capacity was determined in the same manner as the HCUP and HCHP towers. FIG. 27 shows the capacity and demand curves for the tower along its height. The allowable compressive stress in UHPC at the operational limit-state, was limited to the same factor as the HSC, at 0.53 f'c. For a UHPC with 26.0 ksi (179 MPa) compressive strength, this results in a stress limit of 13.8 ksi (95.1 MPa). FIG. 28 illustrates the compressive stress.

Ultimate Moment Capacity

Figure 29:
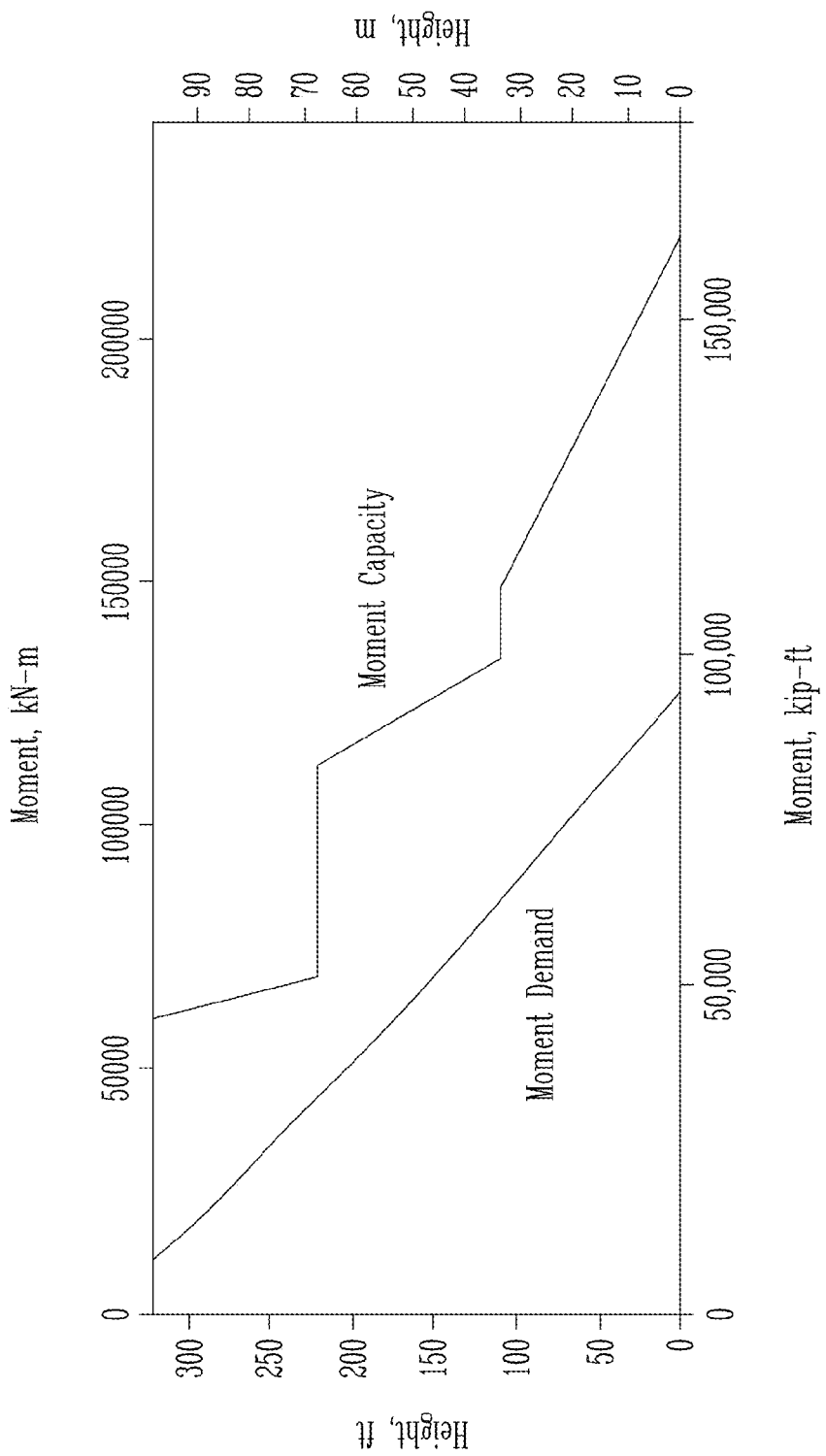
FIG. 29 is a graph illustrating ultimate moment capacity vs. demand of UCUP tower at extreme.

The steps used to determine the ultimate moment capacity of the UCUP tower are similar to those for the HCUP tower. The only modification was to the properties of the columns which change from HSC to UHPC. This includes both the modulus of elasticity and compressive strength. The ultimate moment capacity and moment demand curves are shown in FIG. 29. A compressive strain limitation of 0.004 in/in governed the ultimate moment capacity. This value represents the maximum strain at which the 28-day compressive strength is maintained. Like the previous towers, tendon yielding does take place at the ultimate capacity of the tower. The most critical location occurs at the base of the tower at a magnitude of 0.03683 in/in.

Shear Capacity

The procedures used in the HCUP embodiment, were once again used to determine the shear capacity of the UCUP tower. The lowest value of principal tensile stress can be found at the base of the tower at a magnitude of 16 psi (110 KPa) at operational and 28 psi (190 KPa) at extreme. The tower top is the location of the greatest principal tensile stress of 168 psi (1160 KPa) at the extreme limit state. At operational, the tower is subjected tensile stress of 106 psi (730 KPa).

Fatigue

The concrete fatigue capacity of the tower was determined based on the guidelines provided by the Japan Society of Civil Engineers (JGC No. 9). If the magnitude of stress reversals was less than fatigue strength, $f_{rd}$, the section was deemed acceptable.

Horizontally Post-Tensioned Connection

The horizontally post-tensioned system was designed for both the UCUP tower as well as the HCUP tower. The connection relies on friction between the columns and panels to resist the large shear forces experienced at the interface. By running post-tensioning through the columns and panels perpendicular to the column/panel interface, the capacity of the interface to resist shear is greatly improved.

ACI 318 (2008) was used to determine the additional resistance horizontal posttensioning would provide at the interface. ACI 318 (2008) provides values for friction coefficients that vary depending on the placement of the two sections being analyzed. For concrete placed monolithically, a friction coefficient of 1.4 is to be used. For concrete placed against hardened concrete with an intentionally roughened surface the coefficient drops to 1.0. When placing two hardened concrete segments without intentionally roughened surfaces the coefficient drops even further to a value of 0.6. In order to reduce the required number of strands across the interface, various options were considered to increase the friction coefficient from 0.6. It was determined that by reducing the width of the panel enough to allow for the placement of grout between the columns and panels, a friction coefficient of 1.0 would be acceptable. In addition, the grout would allow for greater tolerance during the construction of the different segments and act to seal the interface joints. This would improve the protection of internal components from the environment.

Figure 30:
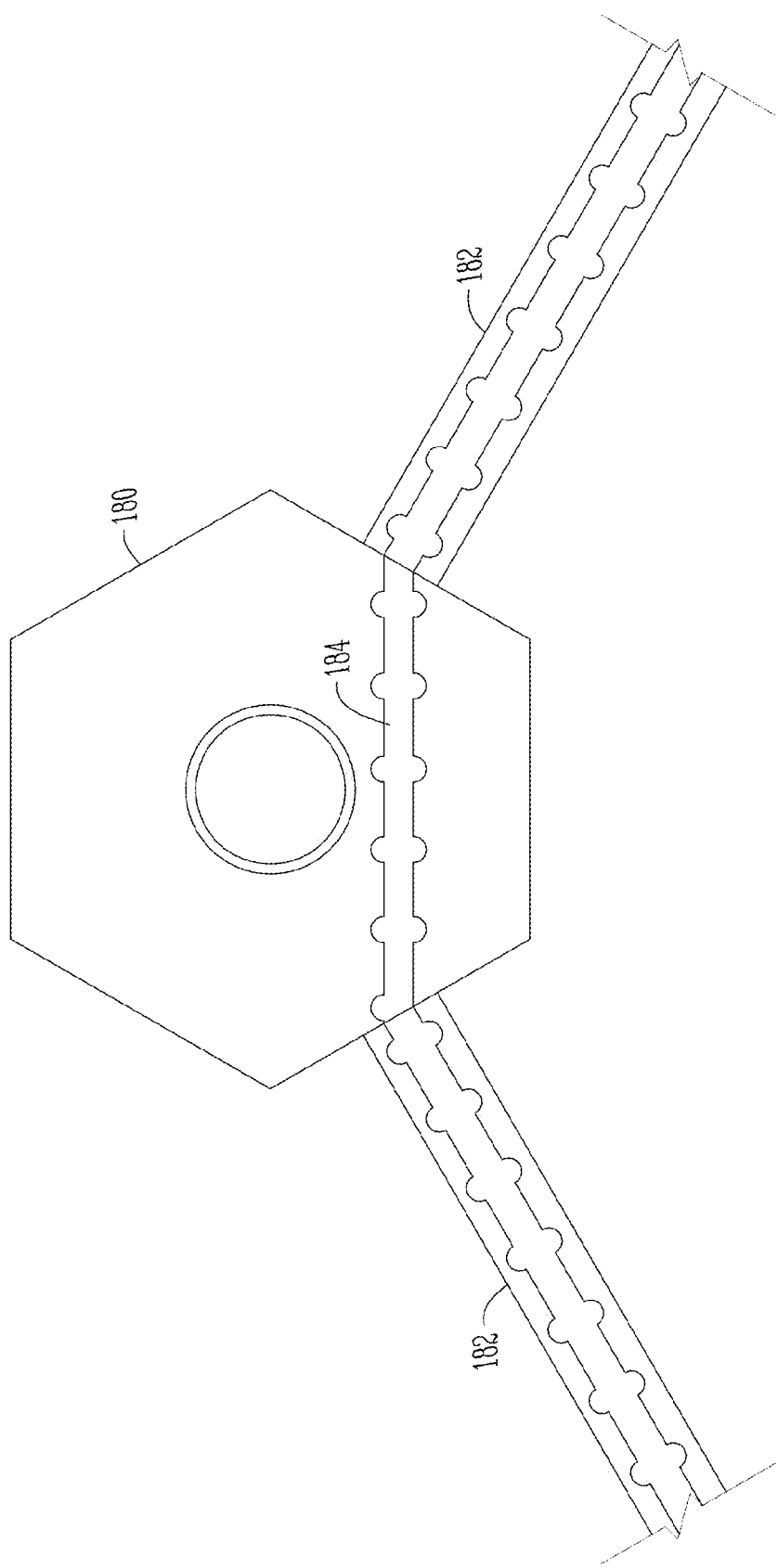
FIG. 30 illustrates a horizontally post-tensioned connection detail.

There are a number of ways in which the horizontal duct could be placed in the column. FIG. 30 shows one of these options with a UHPC or HSC column 180 with UHC panels 182. In order to reduce the difficulty of running the strands around the circumference of the tower, it two tendons may be used at each location. Each tendon 184 would cover half of the towers circumference and terminate on one of the three outside faces of the column.

Yaw Bearing Connection and Foundation

Figure 31:
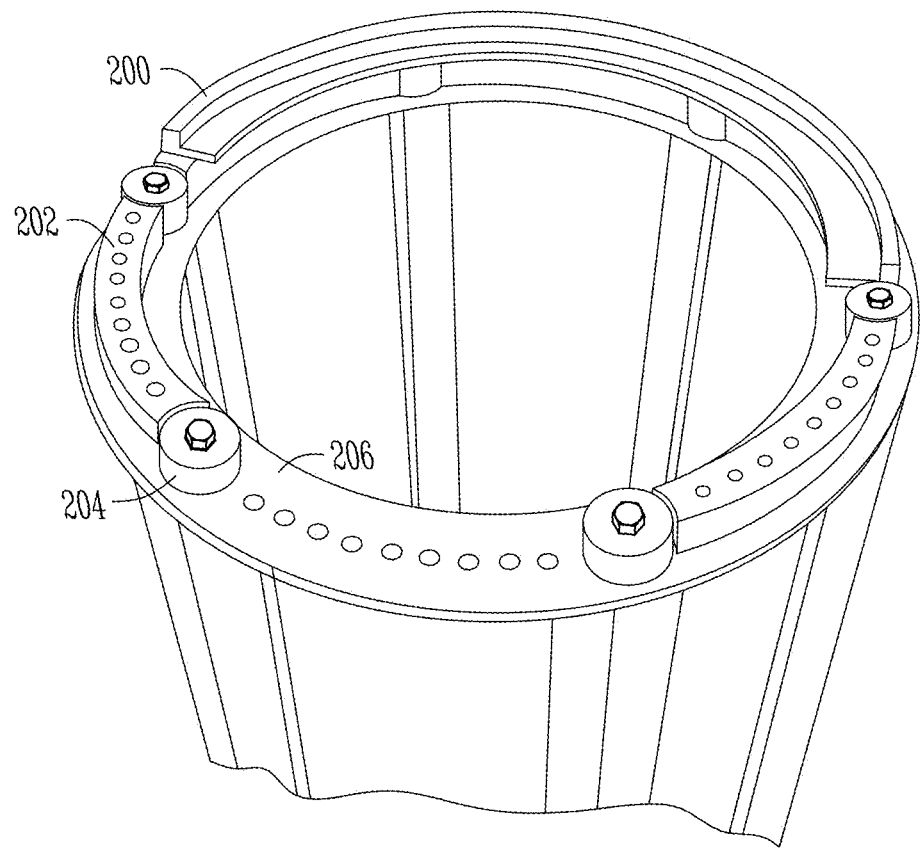
FIG. 31 illustrates a yaw bearing connection at the tower top.

Given the unique design of the proposed towers, traditional means of attaching each to the foundation and yaw bearing are not suitable. Some modifications need to be made that would allow manufacturers to utilize the towers without making changes to other components. Thus concepts for both the yaw bearing connection and foundation are contemplated. The yaw bearing is located at the bottom of the nacelle. It allows the entire head mass to rotate 360° to utilize wind from every direction. The only component separating the yaw bearing from the tower is a brake plate used to prevent this rotation. Steel towers often provide a flange at the top, in which the yaw bearing can be bolted around their perimeter. In the case of the precast concrete towers, this is not feasible. FIG. 31 illustrates the proposed replacement. Because the column post-tensioning anchors sit directly on top of the columns, the brake plate is not able to rest directly on the tower. Instead, risers 202 (formed of UHPC or steel) are used to allow it to sit above the anchorages 204. The risers 202 are attached to a steel ring beam 206, which is placed between the columns and anchorages to secure it in place. The yaw bearing is then attached directly to the brake plate. The only modification to the current design of the brake plate and yaw bearing would be a reduction in the number of bolts used around the perimeter.

Figure 32A:
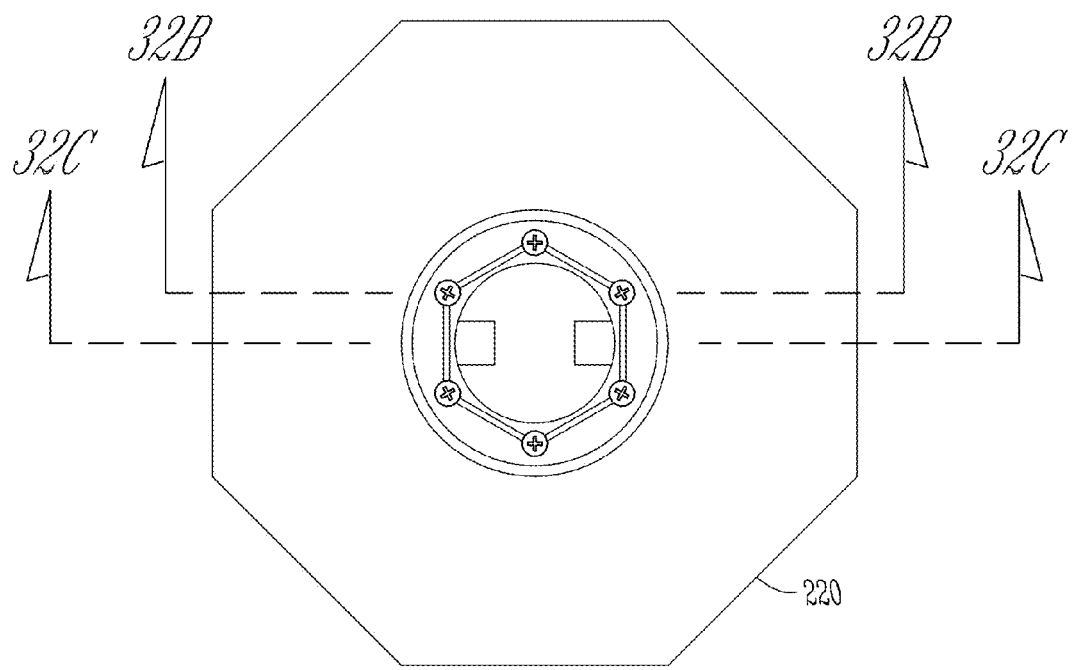
FIG. 32A to FIG. 32C illustrate an example of a foundation layout with an access compartment.
Figure 32B:
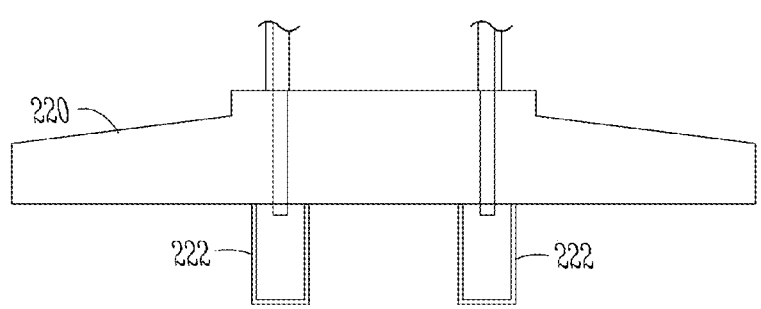
Figure 32C:
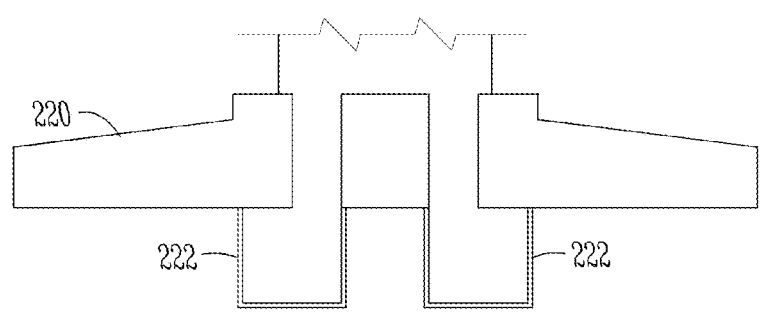

In order to stress the vertical post-tensioning tendons running through each column, jacking needs to take place at either the top or bottom of the tower. With the size of jack required, and difficulties associated with working at 328 ft (100 m), it was desirable to tension the tendons at the bottom of the tower. In order to do so, an access compartment would need to be constructed underneath the foundation. One example of such a design, shown in FIG. 32A to 32C, illustrate a foundation layout 220 which provides for access directly beneath each column to access compartment 222. Outside of the added compartment, the foundation would utilize a standard spread footing.

Based on the experimental and analytical results of this study, it was found that the HCUP tower would perform exceptionally well under the loads of a 2.5 MW turbine. The HSC columns showed little to no damage at both the operational and extreme limit states. The same can be said about the UHPC panels, which provide a number of attractive features over standard or high strength concrete panels. With the reduction in panel thickness, the overall weight and transportation costs of the tower are lowered. Additionally, UHPC requires less labor and is more resistant to corrosive environments. By utilizing HSC columns with larger cross-sectional areas, tower deflections at the operational and extreme limit states are also reduced.

The bolted connection was found to be the weakest of the three tested. Although it met the required load demand of the tower, it had the least favorable effect on the overall tower response in terms of drift and panel performance. Based on observations made during construction, the tight tolerances required for a bolted connection may also create problems during assembly. The horizontally post-tensioned connection demonstrated a much more desirable response. It improved the rigidity of the tower, and limited stress concentrations in the panel. Based on this information, use of this connection in the HCUP tower would be recommended prior to the bolted connection.

The HCHP tower performed well during experimental testing. Its response was very similar to that of the HCUP-HPT concept. With the use of a six inch reinforced high strength concrete panel, without the presence of prestressing steel, cracking at the extreme limit state is expected. This allows the steel reinforcement to be fully engaged at higher strain levels that are associated with the extreme load demand on the tower. The widths of these cracks remain small and largely unnoticed to the naked eye, while increasing the capacity of the section. Some consideration should be made, however, regarding the environment in which the tower is located. Highly corrosive environments could increase long term maintenance costs if cracks are prevalent.

As a result of experimental testing, the UHPC wet joint was found to perform exceptionally well at each limit state. Little to no damage was observed during testing of the critical tower section, verifying the use of the joint at all interface locations. In addition to creating a monolithic section at each elevation, the joint also provides better protection to the internal components of the tower by eliminating the possibility of column/panel separation at the interface. If an efficient method for casting a large number of UHPC wet joints at once can be developed for the construction of a complete tower, the benefits of the joint and HCHP tower in general may be outweigh those of the other two concepts.

UCUP Tower with Horizontally Post-Tensioned Connections

Although UHPC columns were not tested experimentally, the results of the HCUP-HPT and analytical models could be used to accurately predict the response of the UCUP tower with horizontally post-tensioned connections. The results show excellent performance in the panels at and above the extreme limit state will little to no cracking taking place. Similar performance is expected of the UHPC columns given the improved material properties. With the reduction in the cross-sectional area of the tower, tower deflections were higher than those found in a HCUP tower utilizing the same connection. The decreased stiffness also reduces the fundamental natural frequency of the tower, which falls slightly below the requirements of a 2.5 MW turbine. The use of this tower may be most beneficial in coming years when larger turbines require lower tower frequencies and minimal tower weight. Additionally, the costs associated with UHPC may be reduced as the market becomes more competitive with increased usage.

Thus, improved wind turbine towers have been described. Although various embodiments are shown and described it should be apparent that the present invention contemplates numerous variations, options, and alternatives in tower design. Examples of the present invention include towers formed from UHPC including both shell towers and lattice towers. Further examples of lattice towers were described with various types of materials and various types of connections. The present invention contemplates variations in tower size and height, including heights over 100 meters. The present invention further contemplates that towers may be hybrid in nature in that portions may be built from steel in the convention manner and portions from cement materials such as in the manner described herein. The present invention contemplates variations in the specific materials used and numerous variations in design parameters as may be appropriate in particular applications.

What is claimed is:

1. A wind turbine tower system comprising:
   a wind turbine tower with a height of at least 100 meters, said wind turbine tower comprising:
   (a) a plurality of hexagonal-shaped vertical columns comprised of a concrete composition;
   (b) a plurality of panels, each of the plurality of panels extending between adjacent hexagonal-shaped vertical columns;
   (c) wherein the plurality of hexagonal-shaped vertical columns and the plurality of panels are arranged to provide a hexagonal cross-section for the wind turbine tower; and
   a wind turbine mounted on the wind turbine tower.

2. The wind turbine tower system of claim 1 wherein the panels are rectangular panels made from cementitious material.

3. The wind turbine tower system of clam 1 further comprising connections between the panels and the hexagonal-shaped vertical columns.

4. The wind turbine tower system of claim 3 wherein each of the connections is a bolted connection.

5. The wind turbine tower system of clam 3 wherein each of the connections is a ultra high performance concrete (UHPC) wet connection.

6. The wind turbine tower system of claim 3 wherein each of the connections is a post-tensioned connection.

7. The wind turbine tower system of claim 1 wherein the concrete composition is ultra high performance concrete (UHPC).

8. The wind turbine tower system of claim 1 wherein the concrete composition is high strength concrete (HSC) or high performance concrete (HPC).

9. The wind turbine tower system of claim 1 wherein the panels are formed of ultra high performance concrete (UHPC).

10. The wind turbine tower system of claim 1 wherein the panels are formed of high strength concrete (HSC) or high performance concrete (HPC).

11. The wind turbine tower system of claim 1 further comprising a plurality of ducts within the columns with tendons running through the ducts to provide post-tensioning.

12. A wind turbine tower system comprising:
    a wind turbine tower having a vertically extending lattice structure formed of a plurality of modular components, the modular components comprising six hexagonal-shaped vertical columns comprised of a concrete composition and a plurality of panels, each of the plurality of panels extending between adjacent hexagonal-shaped vertical columns, and wherein the six hexagonal-shaped vertical columns and the plurality of panels are arranged to provide a hexagonal cross-section for the wind turbine tower; and
    a wind turbine mounted on the wind turbine tower.

13. The wind turbine tower system of claim 12 wherein the wind turbine tower having a height of at least 100 meters.

14. The wind turbine tower system of claim 12 wherein the columns comprise ultra-high performance concrete (UHPC).

15. The wind turbine tower system of claim 12 wherein the plurality of panels comprise ultra-high performance concrete (UHPC).

16. The wind turbine tower system of claim 12 wherein each of the columns comprise a plurality of ducts with tendons running through the ducts to provide post-tensioning.

17. The wind turbine tower system of claim 12 further comprising bolted connections between the panels and the columns.

18. The wind turbine tower system of claim 12 further comprising ultra high performance concrete (UHPC) wet connections between the panels and the columns.

19. A wind turbine tower system comprising:
    a wind turbine tower with a height of at least 100 meters, said wind turbine tower comprising:

(a) a plurality of vertical columns comprised of a concrete composition;
(b) a plurality of panels, each of the plurality of panels extending between adjacent vertical columns;
(c) wherein the plurality of vertical columns and the plurality of panels are arranged to provide a hexagonal cross-section for the wind turbine tower; and
a wind turbine mounted on the wind turbine tower.

20. The wind turbine tower system of claim 19 wherein the panels are formed of ultra high performance concrete (UHPC).

\* \* \* \* \*